(12) United States Patent
Tsuzaki et al.

(10) Patent No.: US 8,797,275 B2
(45) Date of Patent: Aug. 5, 2014

(54) DISPLAY APPARATUS AND IMAGE PICKUP APPARATUS

(75) Inventors: Ryoichi Tsuzaki, Kanagawa (JP);
Tsutomu Harada, Kanagawa (JP);
Kazunori Yamaguchi, Kanagawa (JP);
Mitsuru Tateuchi, Kanagawa (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 1090 days.

(21) Appl. No.: 12/369,428

(22) Filed: Feb. 11, 2009

(65) Prior Publication Data

US 2009/0207145 A1 Aug. 20, 2009

(30) Foreign Application Priority Data

Feb. 14, 2008 (JP) ................................. 2008-033261

(51) Int. Cl.
*G06F 3/041* (2006.01)

(52) U.S. Cl.
USPC ........... 345/173; 345/156; 345/174; 345/175; 345/176; 345/177; 178/18.01; 178/18.02; 178/18.03; 178/18.05; 178/18.07

(58) Field of Classification Search
USPC ................................ 345/156, 157, 173–184; 178/18.01–18.09, 18.11
See application file for complete search history.

(56) References Cited

U.S. PATENT DOCUMENTS

| | | | |
|---|---|---|---|
| 6,614,422 B1 * | 9/2003 | Rafii et al. ..................... 345/168 |
| 2002/0042699 A1 * | 4/2002 | Tanaka et al. .................... 703/2 |
| 2006/0192766 A1 | 8/2006 | Nakamura et al. |
| 2007/0019749 A1 * | 1/2007 | Gaikwad et al. .............. 375/260 |
| 2008/0084526 A1 * | 4/2008 | Yamanaka et al. ............ 349/111 |

FOREIGN PATENT DOCUMENTS

| | | |
|---|---|---|
| JP | 2004318819 | 11/2004 |
| JP | 2006-079499 | 3/2006 |
| JP | 2007-011152 | 1/2007 |
| JP | 2007-128497 | 5/2007 |
| JP | 2007-183706 | 7/2007 |

OTHER PUBLICATIONS

Japanese Office Action corresponding to JP2008-033261 issued on Jan. 21, 2010.

* cited by examiner

*Primary Examiner* — Srilakshmi K Kumar
*Assistant Examiner* — Insa Sadio
(74) *Attorney, Agent, or Firm* — K&L Gates LLP

(57) ABSTRACT

An HPF eliminates an image of an object which is not to be detected from a captured image, thereby obtaining an HPF image. A binarizing unit performs a binarizing process on the HPF image, thereby generating a binary image. A peak detector extracts, using the binary image as a mask, an image of a region corresponding to an opening of the mask from the captured image. From the image, a peak value and the position of a peak pixel are detected. A determining unit determines whether an object to be detected is in contact with the display surface or not on the basis of the relation between the difference and the threshold. Using the detection result and the determination result in the determining unit, a position deriving unit derives the position on the display surface, of the object to be detected which is in contact with the display surface.

10 Claims, 17 Drawing Sheets

Pc=P22, P23, P24, P32, P34, P42, P43, P46

33-1

| $P_{11}$ | $P_{12}$ | $P_{13}$ | $P_{14}$ | $P_{15}$ |
|---|---|---|---|---|
| $P_{21}$ | $P_{22}$ | $P_{23}$ | $P_{24}$ | $P_{25}$ |
| $P_{31}$ | $P_{32}$ | $P_{33}$ | $P_{34}$ | $P_{35}$ |
| $P_{41}$ | $P_{42}$ | $P_{43}$ | $P_{44}$ | $P_{45}$ |
| $P_{51}$ | $P_{52}$ | $P_{53}$ | $P_{54}$ | $P_{55}$ |

| $P_{11}$ | $P_{12}$ | $P_{13}$ | $P_{14}$ | $P_{15}$ |
|---|---|---|---|---|
| $P_{21}$ | $P_{22}$ | $P_{23}$ | $P_{24}$ | $P_{25}$ |
| $P_{31}$ | $P_{32}$ | $P_{33}$ | $P_{34}$ | $P_{35}$ |
| $P_{41}$ | $P_{42}$ | $P_{43}$ | $P_{44}$ | $P_{45}$ |
| $P_{51}$ | $P_{52}$ | $P_{53}$ | $P_{54}$ | $P_{55}$ |

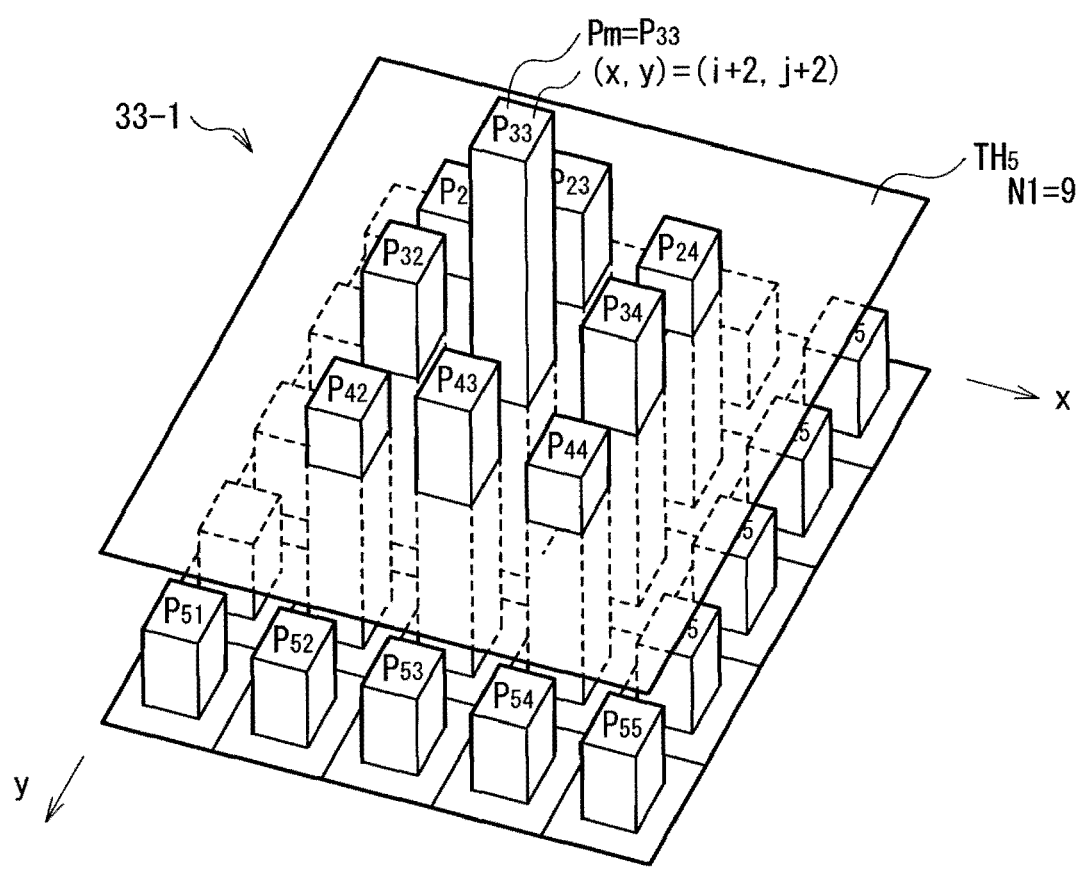
F I G. 20

DISPLAY APPARATUS AND IMAGE PICKUP APPARATUS

CROSS REFERENCE TO RELATED APPLICATIONS

The present application claims priority to Japanese Patent Application JP 2008-033261 filed in the Japanese Patent Office on Feb. 14, 2008, the entire contents of which is being incorporated herein by reference.

BACKGROUND

The present application relates to a display apparatus and an image pickup apparatus having the function of detecting a contact position of an object to be detected such as a finger or a pen.

Techniques for detecting a position where an object to be detected such as a finger or a pen is in contact with a display face of a display apparatus are known. Among them, a typified and popularized technique is a display apparatus having a touch panel. There are various types of touch panels, and a popularized one is a resistive type. In this type, a panel surface has a stack structure in which a very small spacer is sandwiched between glass and a film facing each other, and a transparent electrode grating is provided for each of the facing surfaces of the glass and the film. When the surface of the film is touched with a finger or a pen, the film is deformed, the transparent electrode on the film surface and the transparent electrode on the glass surface come into contact with each other, and current flows. By measuring a voltage dividing ratio of resistance of the transparent electrodes on the glass surface and the film surface, the position of the finger or the pen is detected. Therefore, by using such a touch panel, the user is able to operate intuitively.

In a touch panel of this type, however, a panel has to be pressed with pressure by a finger or pen to make position information detected. There is consequently a disadvantage such that if the press force is weak, the position information may not be detected correctly.

To address the disadvantage, recently, various techniques capable of detecting the position of an object to be detected without providing such a touch panel on the display surface are proposed. For example, Japanese Unexamined Patent Application Publication No. 2004-318819 (patent document 1) proposes a liquid crystal display in which light reception elements are disposed adjacent to a display pixel and, in a period in which display (light emission) stops, light reception is performed by the light reception elements. When such a display apparatus is used, the position of an object to be detected may be detected on the basis of a captured image. Therefore, by using such a display apparatus, the position of an object to be detected may be detected with a simple configuration without providing a part such as a touch panel on the display surface.

However, at the time of capturing a video image to be detected or the like in such a display apparatus, the intensity of light received is influenced by the ambient environment (brightness). In particular, in the case where a display apparatus whose ambient environment easily changes such as a portable electronic device is provided with the function of detecting the position of an object to be detected, light receiving conditions in a state where the environment is dark and those in a state where the environment is light are largely different from each other. It is difficult to detect the position of an object to be detected in uniform light reception conditions.

For example, the patent document 1 proposes a measure of detecting a change with time of black and white of data captured when an object to be detected approaches or comes into contact with a display surface in a liquid crystal display and specifying the position of the object to be detected in consideration of the ambient brightness. The patent document 1 also proposes another measure. In the case of making a fine-tipped object such as a pen approach or come into contact with the display surface, in consideration that a change with time of black and white of captured data does not become large, the tip of the pen is made of a soft material. When the pen comes into contact with the display surface, the tip of the pen is deformed and the contact area changes.

However, in the measure of the patent document 1, at the time of writing a character or a picture by touching the display surface with a fine-tipped object such as a pen, a special pen as described above has to be used, and there is a disadvantage that simplicity deteriorates.

SUMMARY

It is therefore desirable to provide a display apparatus enabling a user to write a character or a picture by touching a display surface with a fine-tipped object such as a pen without deteriorating simplicity.

According to an embodiment, there is provided a first display apparatus as an embodiment is an apparatus for performing display of an image and light reception simultaneously or alternately, and includes a panel unit having a plurality of light emission cells emitting light to display an image on a display surface and a plurality of light reception cells receiving light entering from the display surface side. The display apparatus further includes: a peak detector detecting a peak value from pixel data of an image captured from the plurality of light reception cells or an image obtained by performing a predetermined process on the captured image, and detecting position of a peak pixel having the peak value; a determining unit determining that an object to be detected is in contact with the display surface when the difference between pixel data of the peak pixel and pixel data of peripheral pixels of the peak pixel, or a value obtained by dividing the pixel data of the peak pixel with the difference is larger than a first threshold, and determining that an object to be detected is not in contact with the display surface when the difference is equal to or less than the first threshold; and a position deriving unit deriving position on the display surface, of the object to be detected which is in contact with the display surface using results (a detection result and a determination result) in the determining unit.

According to an embodiment, there is provided a first image pickup apparatus as an embodiment includes a first panel unit having a plurality of light reception cells receiving light entering from a contact surface side. The image pickup apparatus further includes: a peak detector detecting a peak value from pixel data of an image captured from the plurality of light reception cells or an image obtained by performing a predetermined process on the captured image, and detecting position of a peak pixel having the peak value; a determining unit determining that an object to be detected is in contact with the contact surface when the difference between pixel data of the peak pixel and pixel data of peripheral pixels of the peak pixel, or a value obtained by dividing the pixel data of the peak pixel by the difference is larger than a first threshold, and determining that an object to be detected is not in contact with the contact surface when the difference is equal to or less than the first threshold; and a position deriving unit deriving position on the display surface, of the object to be detected which is in contact with the contact surface using results (a detection result and a determination result) in the determining unit.

In the first display apparatus and the first image pickup apparatus of the embodiment, in the determining unit, when the difference between pixel data of the peak pixel and pixel data of peripheral pixels of the peak pixel, or a value obtained by dividing the pixel data of the peak pixel by the difference is larger than a first threshold, it is determined that an object to be detected is in contact with a display surface (contact surface). When the difference is equal to or less than the first threshold, it is determined that an object to be detected is not in contact with the display surface (contact surface). The magnitude of the difference is proportional to the magnitude of a tilt of the pixel data between the peak pixel and the peripheral pixels (peak peripheral tilt). The magnitude of the peak peripheral tilt is inversely proportional to the size of an image to be detected which is in contact with the display surface (contact surface) (an image of an object to be detected appearing in the captured image obtained when the object to be detected is in contact with the display surface (contact surface)). Consequently, when the image of the object to be detected which is in contact with the display surface (contact surface) is large, the difference is small. When the image of the object to be detected which is in contact with the display surface (contact surface) is small, the difference is large. Therefore, by properly setting the first threshold in accordance with the size expected as that of an image of the object to be detected, whether the object to be detected is in contact with the display surface (contact surface) or not may be determined from the relation between the difference and the first threshold, or the relation between the value obtained by dividing the pixel data of the peak pixel by the difference and the first threshold.

According to an embodiment, there is provided a second display apparatus as an embodiment is an apparatus for performing display of an image and light reception simultaneously or alternately, and includes a panel unit having a plurality of light emission cells emitting light to display an image on a display surface and a plurality of light reception cells receiving light entering from the display surface side. The plurality of light reception cells are disposed so that the number of cells included per size expected as that of an image of an object to be detected is at least four. The display apparatus further includes: a peak detector detecting a peak value from pixel data of an image captured from the plurality of light reception cells or an image obtained by performing a predetermined process on the captured image, and detecting position of a peak pixel having the peak value; a determining unit determining that an object to be detected is in contact with the display surface when the number of pixels (exceeding number) whose pixel data values in a pixel region including the peak pixel and peripheral pixels of the peak pixel exceed a first threshold is equal to or larger than the (expected) number of the light reception cells included per size expected as that of an image of the object to be detected, and determining that an object to be detected is not in contact with the display surface when the number of pixels whose pixel data values exceed the first threshold is below the number of the light reception cells included per size expected as that of an image of an object to be detected; and a position deriving unit deriving position on the display surface, of the object to be detected which is in contact with the display surface using results (a detection result and a determination result) in the determining unit.

According to an embodiment, there is provided a second image pickup apparatus as an embodiment includes a first panel unit having a plurality of light reception cells receiving light entering from a contact surface side. The plurality of light reception cells are disposed so that the number of cells included per size expected as that of an image of an object to be detected is at least four. The image pickup apparatus further includes: a peak detector detecting a peak value from pixel data of an image captured from the plurality of light reception cells or an image obtained by performing a predetermined process on the captured image, and detecting position of a peak pixel having the peak value; a determining unit determining that an object to be detected is in contact with the contact surface when the number of pixels whose pixel data values exceed a first threshold in an pixel region including the peak pixel and peripheral pixels of the peak pixel is equal to or larger than the (expected) number of the light reception cells included per size expected as that of an image to be detected, and determining that an object to be detected is not in contact with the contact surface in the case where the number of pixels (exceeding number) whose pixel data values exceed the first threshold is below the number of light reception cells included per size expected as that of an image to be detected; and a position deriving unit deriving position on the display surface, of the object to be detected which is in contact with the contact surface using results (a detection result and a determination result) in the determining unit.

In the second display apparatus and the second image pickup apparatus of the embodiment, when the exceeding number is equal to or larger than the expected number, it is determined that an object to be detected is in contact with the contact surface. When the exceeding number is below the expected number, it is determined that an object to be detected is not in contact with the contact surface. The expected number is proportional to the size of an image of an object to be detected which is in contact with the display surface (contact surface) (an image of an object to be detected appearing in a captured image obtained when the object to be detected is in contact with the display surface (contact surface)). When an image of an object to be detected which is in contact with the display surface (contact surface) is large, the expected number is also large. When an image of an object to be detected which is in contact with the display surface (contact surface) is small, the expected number is also small. Therefore, by properly setting the expected number and the first threshold in accordance with the size expected as that of an image of the object to be detected, whether the object to be detected is in contact with the display surface (contact surface) or not may be determined from the relation between the difference and the first threshold, or the relation between the exceeding number and the expected number.

According to the first display apparatus and the first image pickup apparatus of the embodiment, whether an object to be detected is in contact with a display surface (contact surface) or not is determined from the relation between the difference and the first threshold or the relation between a value obtained by dividing the pixel data of the peak pixel with the difference and the first threshold. Consequently, even when an object to be detected is a fine-tipped object such as a pen, the position on the display surface (contact surface) at the time of contact of the object to be detected may be easily detected. As a result, it becomes unnecessary to use a special pen whose tip is deformed and whose contact area changes when the pen comes into contact with the display surface. Therefore, without deteriorating simplicity, a character or a picture may be written by touching the display surface (contact surface) with a fine-tipped object such as a pen.

According to the second display apparatus and the second image pickup apparatus of the embodiment, whether an object to be detected is in contact with a display surface (contact surface) or not is determined from the relation between the exceeding number and the expected number. Consequently, even when an object to be detected is a fine-tipped object such as a pen, the position on the display surface (contact surface) at the time of contact of the object to be detected may be easily detected. As a result, it becomes unnecessary to use a special pen whose tip is deformed and whose contact area changes when the pen comes into contact with the display surface. Therefore, without deteriorating simplicity, a character or a picture may be written by touching the display surface (contact surface) with a fine-tipped object such as a pen.

Additional features and advantages are described herein, and will be apparent from the following Detailed Description and the figures.

BRIEF DESCRIPTION OF THE FIGURES

FIG. 12 is a schematic diagram schematically illustrating another example of the peripheral pixels.

FIG. 13 is a schematic diagram schematically illustrating still another example of the peripheral pixels.

FIG. 20 is a schematic diagram schematically illustrating the relation between an example of a profile of pixel data of an image extracted from a captured image by a peak detector with a threshold.

DETAILED DESCRIPTION

The present application will be described in detail with reference to the drawings according to an embodiment.

First Embodiment

Figure 1:
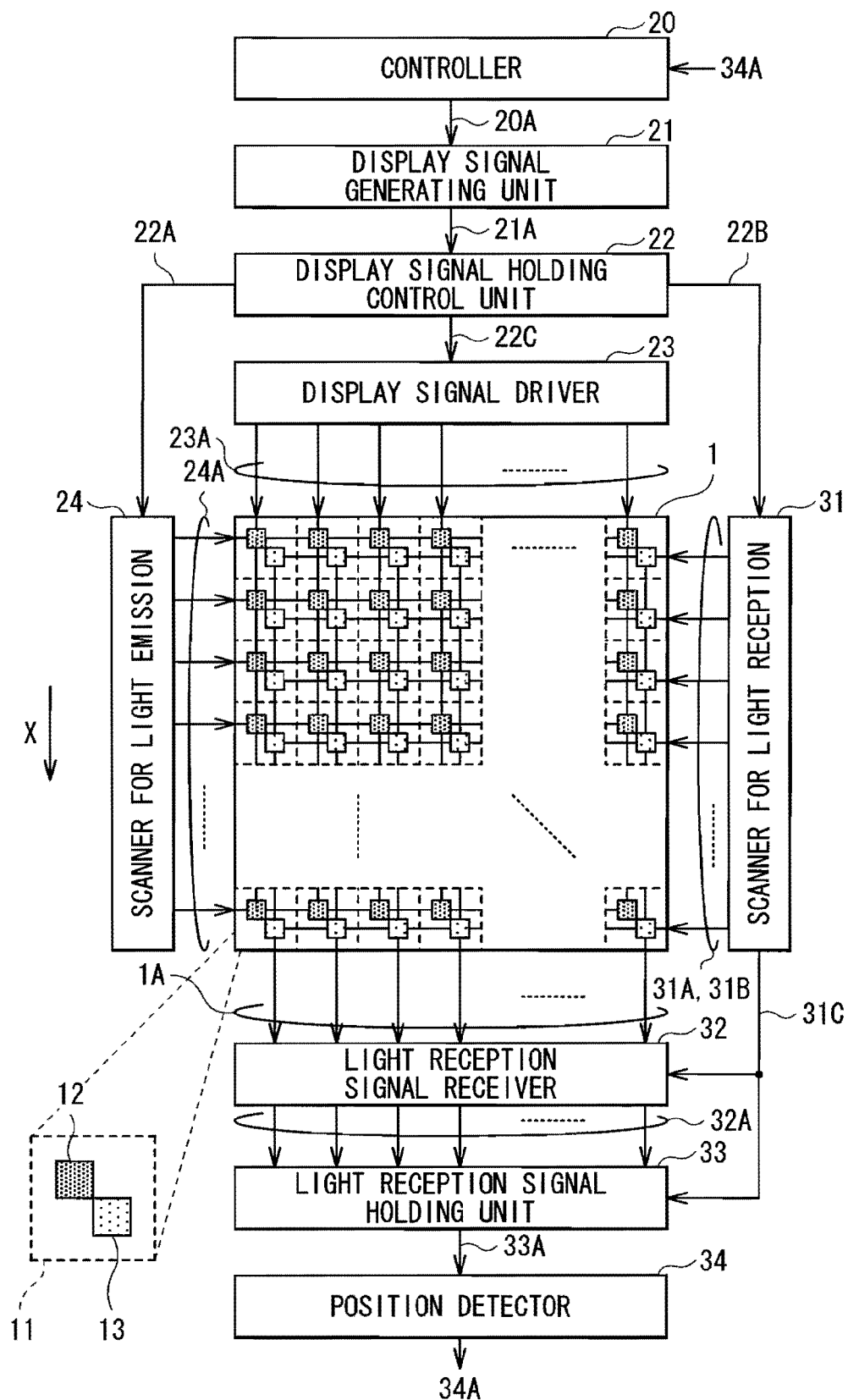
FIG. 1 is a block diagram illustrating a whole configuration of a display apparatus according to a first embodiment.

FIG. 1 illustrates a general configuration of a display apparatus according to a first embodiment. The display apparatus has a display unit 1, a controller 20, a display signal generating unit 21, a display signal holding control unit 22, a display signal driver 23 (light emission cell drive unit), a scanner 24 for light emission, a scanner 31 for light reception, a light reception signal receiver 32, a light reception signal holding unit 33, and a position detector 34. The display apparatus is able to perform display of an image and light reception simultaneously or alternately. The display apparatus displays an image based on display data 20A (which will be described later) on the display unit 1 and detects the position of an object (object to be detected) in contact with or approaching the display unit 1.

The display unit 1 is configured of an LCD (Liquid Crystal Display) in which a plurality of pixels 11 are disposed in a matrix on the entire surface of the display unit 1. The display unit 1 displays an image such as a predetermined figure or characters by performing line-sequential operation as will be described later.

Figure 2:
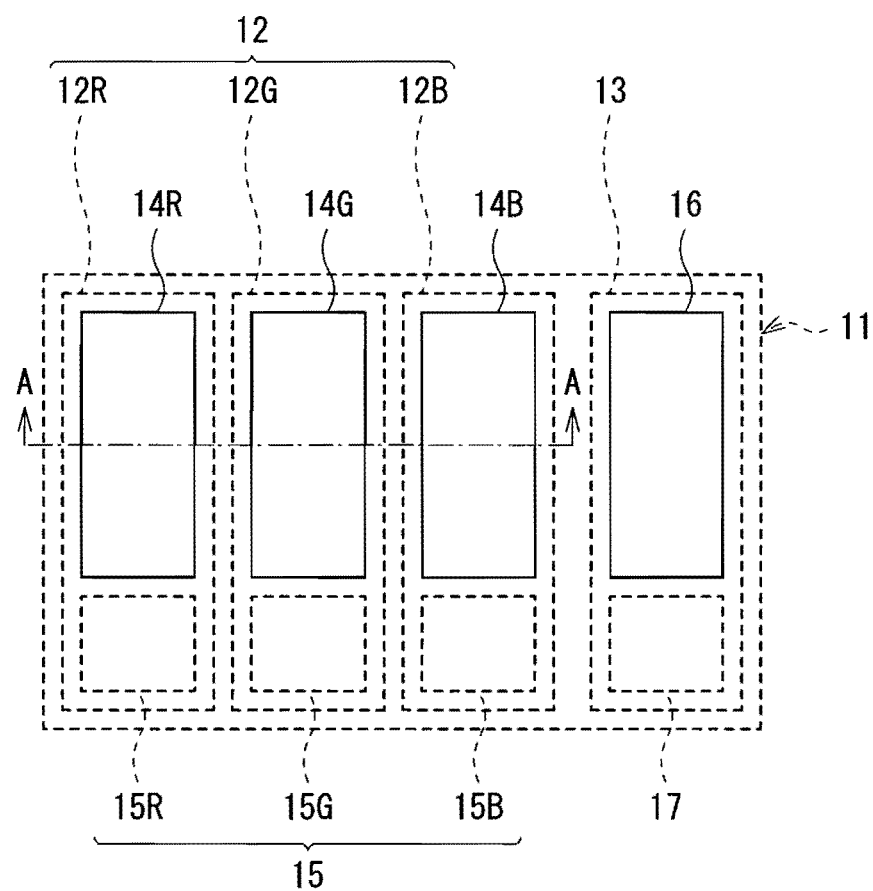
FIG. 2 is a plan view schematically illustrating an example of the configuration of a light emission cell and a light reception cell in FIG. 1.

FIG. 2 is a plan view illustrating an example of the configuration of each of the pixels 11. Each of the pixels 11 is constructed by a light emission cell 12 for emitting visible light and a light reception cell 13 for receiving light entering from a display surface 10 (refer to FIG. 3) side. The light emission cell 12 has a red light emission cell 12R for emitting red light, a green light emission cell 12G for emitting green light, and a blue light emission cell 12B for emitting blue light. The red light emission cell 12R has a red light emitting element 14R as a part for emitting red light and a TFT (Thin Film Transistor) circuit section 15R for driving the red light emitting element 14R. Similarly, the green light emission cell 12G has a green light emitting element 14G as a part for emitting green light and a TFT circuit section 15G for driving the green light emitting element 14G. The blue light emission cell 12B has a blue light emitting element 14B as a part for emitting blue light and a TFT circuit section 15B for driving the blue light emitting element 14B. On the other hand, the light reception cell 13 has a light receiving element 16 as a part for receiving visible light or non-visible light, and a light reception sensor circuit section 17 for driving the light receiving element 16. The light receiving element 16 includes, for example, a photodiode and the like. The details of the connection relations among the red light emitting element 14R, the green light emitting element 14G, the blue light emitting element 14B, and the TFT circuit section 15 and the connection relations among the TFT circuit section 15, the display signal driver 23, the scanner 24 for light emission, the scanner 31 for light reception, and the light reception signal receiver 32 will be described later (FIG. 4).

Figure 3:
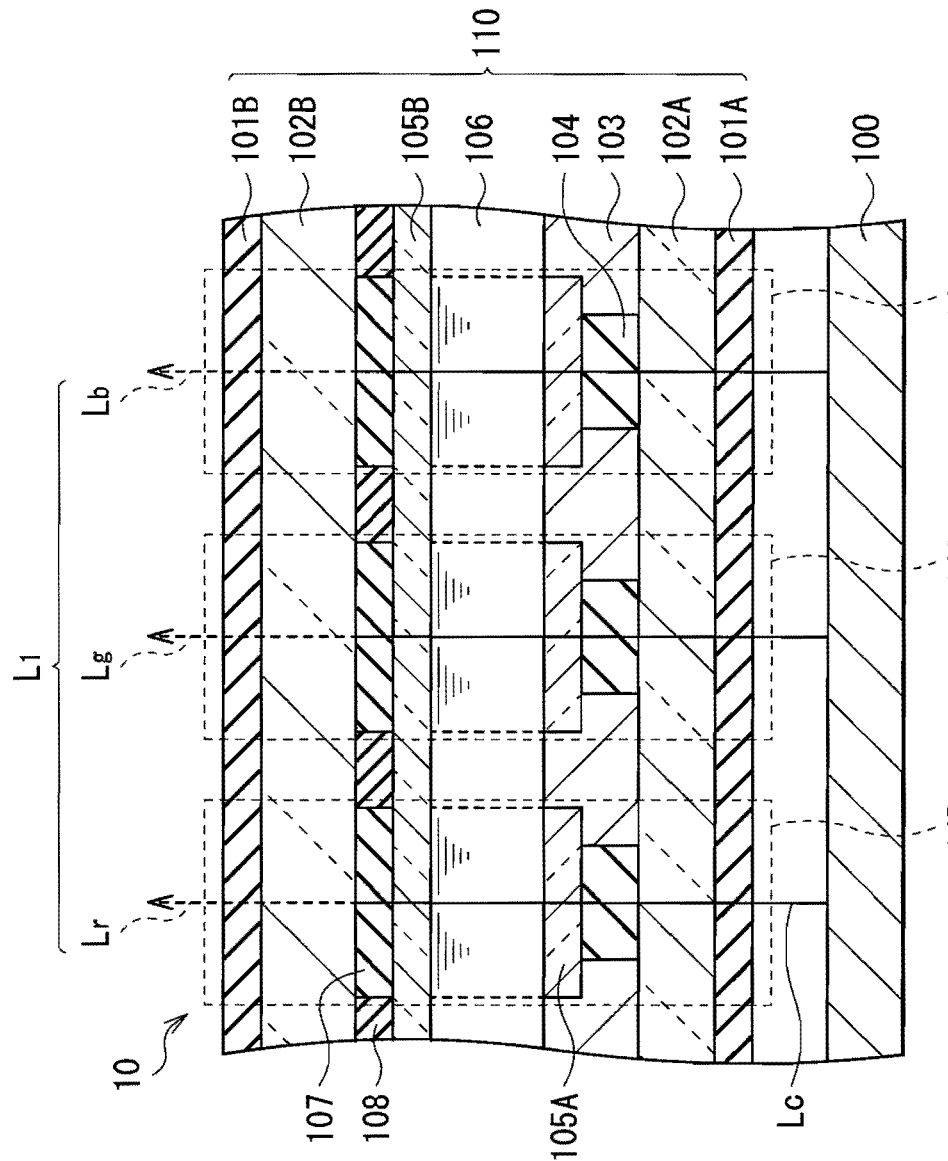
FIG. 3 is a cross section schematically illustrating an example of the configuration of a light emission device in FIG. 1.
Figure 4:
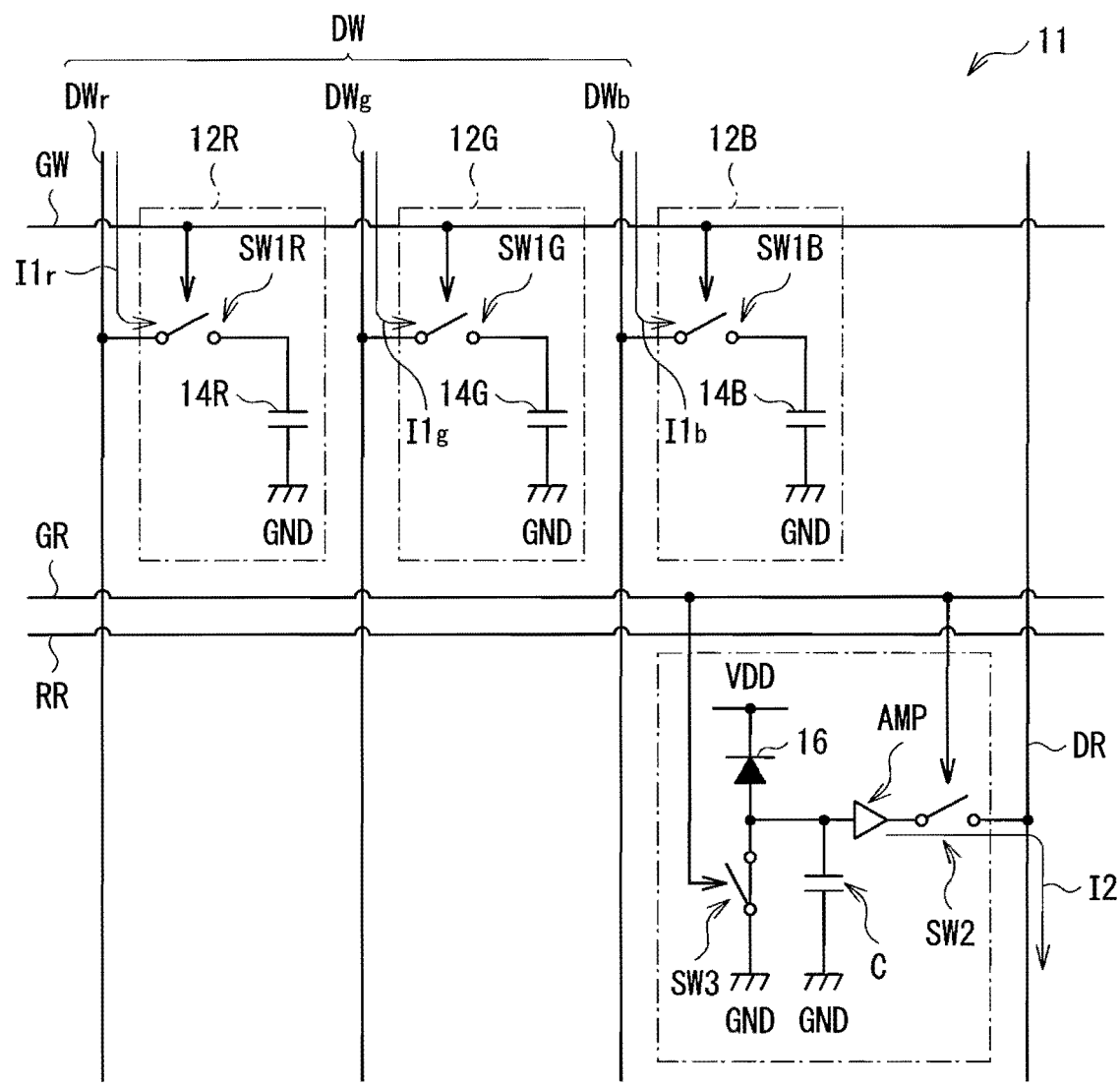
FIG. 4 is a circuit diagram schematically illustrating an example of the configuration of each of pixels in FIG. 1.

FIG. 3 is a cross section taken along line A-A of FIG. 2, and illustrates an example of a sectional configuration of the display unit 1. The display unit 1 has, on a light source 100, a panel unit 110 having a stack structure constructing light emitting elements (the red light emitting element 14R, the green light emitting element 14G, and the blue light emitting element 14B). The panel unit 110 is a so-called liquid crystal display panel and includes, concretely, from the light source 100 side, a polarizing plate 101A, a transparent substrate 102A, a circuit section 103, an insulating layer 104, a transparent pixel electrode 105A, a liquid crystal layer 106, a transparent electrode 105B, a color filter 107, a black matrix 108, a transparent substrate 102B, and a polarizing plate 101B. Specifically, the light emitting elements (the red light emitting element 14R, the green light emitting element 14G, and the blue light emitting element 14B) are provided in the liquid crystal display panel having the liquid crystal layer 106 between the transparent substrates 102A and 102B facing each other.

The light source 100 has a backlight for emitting light in the visible light region toward the liquid crystal elements. In the case where the light receiving element 16 receives mainly the non-visible light, the light source 100 has not only a backlight for emitting light of the visible light region but also a backlight for emitting the light in the non-visible light region toward the liquid crystal elements. The transparent substrates 102A and 102B are made of, for example, a glass material. Alternatively, the transparent substrates 102A and 102B may be made of a transparent plastic material in place of the glass material.

The circuit section 103 is a part corresponding to the TFT circuit section 15 and the light receiving element circuit section 17 illustrated in FIG. 2 and is electrically connected to the transparent pixel electrodes 105A. The transparent pixel electrode 105A is disposed in each light emitting element and is made of a transparent material such as ITO (Indium Tin Oxide). On the other hand, the transparent electrode 105B is a common electrode facing the transparent electrode 105A and is made of a transparent material such as ITO in a manner similar to the transparent electrode 105A. The insulating layer 104 is formed between the circuit sections 103. With such a configuration, a voltage according to display data is applied across the transparent electrodes 105A and 105B, and backlight Lo from the light source 100 passes through the liquid crystal layer 106 or is blocked.

The color filter 107 is disposed in a region corresponding to the light emission cell 12 (the red light emission cell 12R, the green light emission cell 12G, and the blue light emission cell 12B). The color filter 107 selectively transmits light in a wavelength region corresponding to its light emission color in the backlight Lo passed through the liquid crystal layer 106. The black matrix 108 is disposed between the color filters 107 and blocks the backlight Lo from the light source 100 so that the backlight Lo does not go to the display surface 10 side.

FIG. 4 illustrates an example of the circuit configuration in each of the pixels 11. As described above, each pixel 11 has the light emission cell 12 constructed by the red light emission cell 12R, the green light emission cell 12G, and the blue light emission cell 12B, and the light reception cell 13. To the light emission cell 12, a display data supply line DW connected to the display signal driver 23 and a light emission gate line GW connected to the scanner 24 for light emission are connected. Concretely, a display data supply line DWr and the light emission gate line GW are connected to the red light emission cell 12R. A display data supply line DWg and the light emission gate line GW are connected to the green light emission cell 12G. A display data supply line DWb and the light emission gate line GW are connected to the blue light emission cell 12B. On the other hand, to the light reception cell 13, a light reception gate line GR and a light reception reset line RR connected to the scanner 31 for light reception and a data reading line DR connected to the light reception signal receiver 32 are connected.

The red light emission cell 12R has the red light emitting element 14R and the TFT circuit section 15R including a light emitting element selection switch SW1R for driving the red light emitting element 14R. One end of the light emitting element selection switch SW1R is connected to the display data supply line DWr, and the other end is connected to one end of the red light emitting element 14R (concretely, the transparent pixel electrode 105A). Further, the other end of the red light emitting element 14R (concretely, the transparent electrode 105B) is grounded. Similarly, the green light emission cell 12G has the green light emitting element 14G and the TFT circuit section 15G including a light emitting element selection switch SW1G for driving the green light emitting element 14G. One end of the light emitting element selection switch SW1G is connected to the display data supply line DWg, and the other end is connected to one end of the green light emitting element 14G. Further, the other end of the green light emitting element 14G is grounded. The blue light emission cell 12B has the blue light emitting element 14B and the TFT circuit section 15B including a light emitting element selection switch SW1B for driving the blue light emitting element 14B. One end of the light emitting element selection switch SW1B is connected to the display data supply line DWb, and the other end is connected to one end of the blue light emitting element 14B. Further, the other end of the blue light emitting element 14B is grounded. The on/off operation of the light emitting element selection switches SW1R, SW1G, and SW1B is controlled by the light emission gate line GW. Each of the light emitting element selection switches SW1R, SW1G, and SW1B is a switching element such as a TFT.

The light reception cell 13 has the light receiving element 16 (a photodiode in the example of FIG. 4), light receiving element selection switches SW2 and SW3 provided in the light receiving element circuit section 17, a buffer amplifier AMP, and a capacitor C. One end of the light receiving element 16 is connected to the power source line VDD, and the other end is connected to the input terminal of the buffer amplifier AMP. The output terminal of the buffer amplifier AMP is connected to one end of the light receiving element selection switch SW2, and the other end of the light receiving element selection switch SW2 is connected to the data reading line DR. Further, the input terminal of the buffer amplifier AMP is connected to one end of the light receiving element selection switch SW3, and one end of the capacitor C. The other end of the light receiving element selection switch SW3 and the other end of the capacitor C are grounded. The on/off operation of the light receiving element selection switch SW2 is controlled by the light reception gate line GR. The on/off operation of the light receiving element selection switch SW3 is controlled by the reset line RR for light reception. Each of the light receiving element selection switches SW2 and SW3 is a switching element such as a TFT.

Next, the configuration other than the display unit 1 in the display apparatus (the controller 20, the display signal generating unit 21, the display signal holding control unit 22, the display signal driver 23, the scanner 24 for light emission, the scanner 31 for light reception, the light reception signal receiver 32, the light reception signal holding unit 33, and the position detector 34) will be described.

The controller 20 executes a process according to predetermined application software (not illustrated) on the basis of a result of detection of the position detector 34 and generates, for example, the display data 20A including position coordinates (position information) of an object to be detected. The display data 20A generated is output to the display signal generating unit 21.

The display signal generating unit 21 generates a display signal 21A to be displayed on the display unit 1, for example, every screen (every one field) on the basis of the display data 20A supplied from the controller 20. The generated display signal 21A is output to the display signal holding control unit 22.

Figure 5:
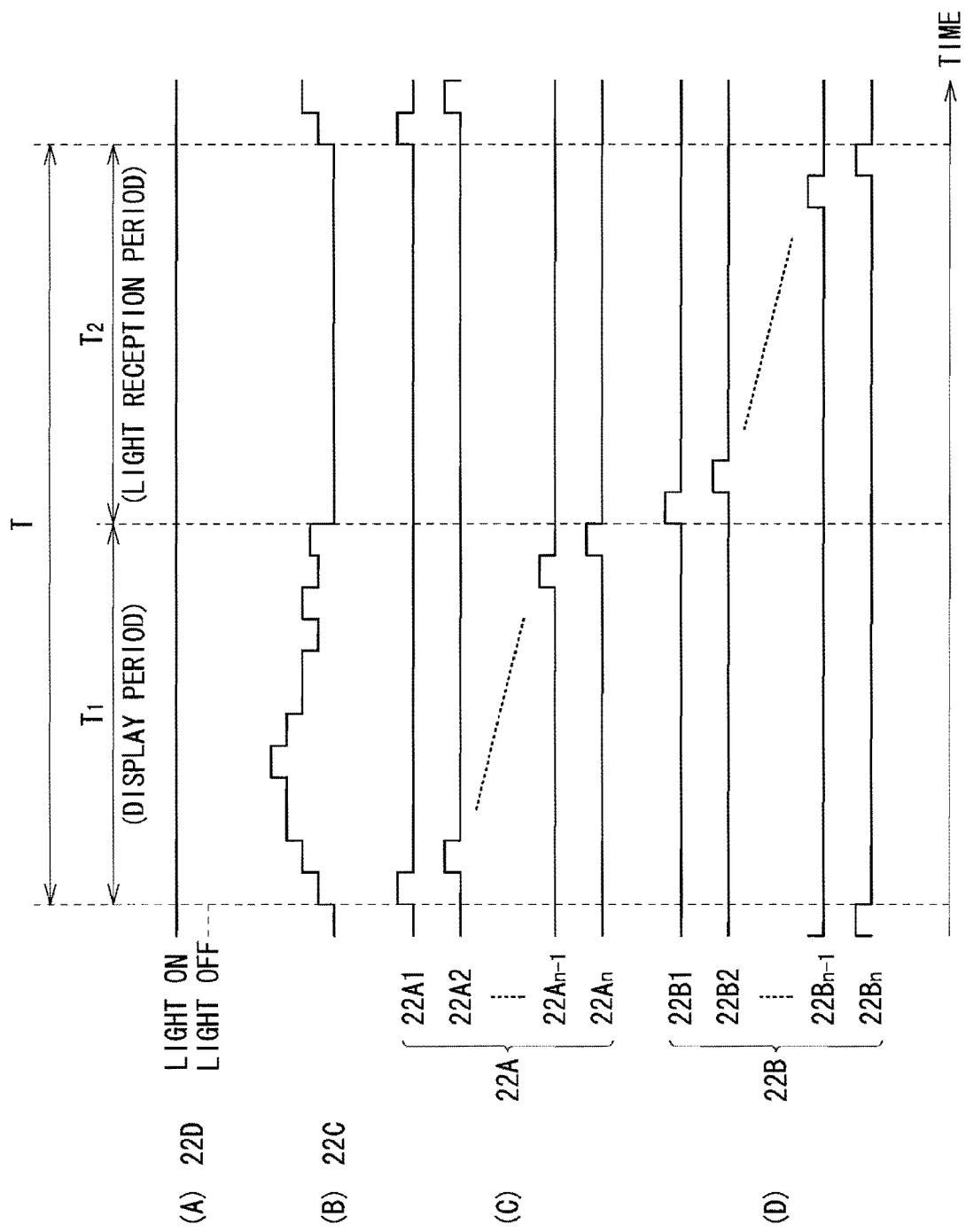
FIG. 5 is a timing chart illustrating an example of process of detecting an object to be detected by a line-sequential operation.
Figure 6:
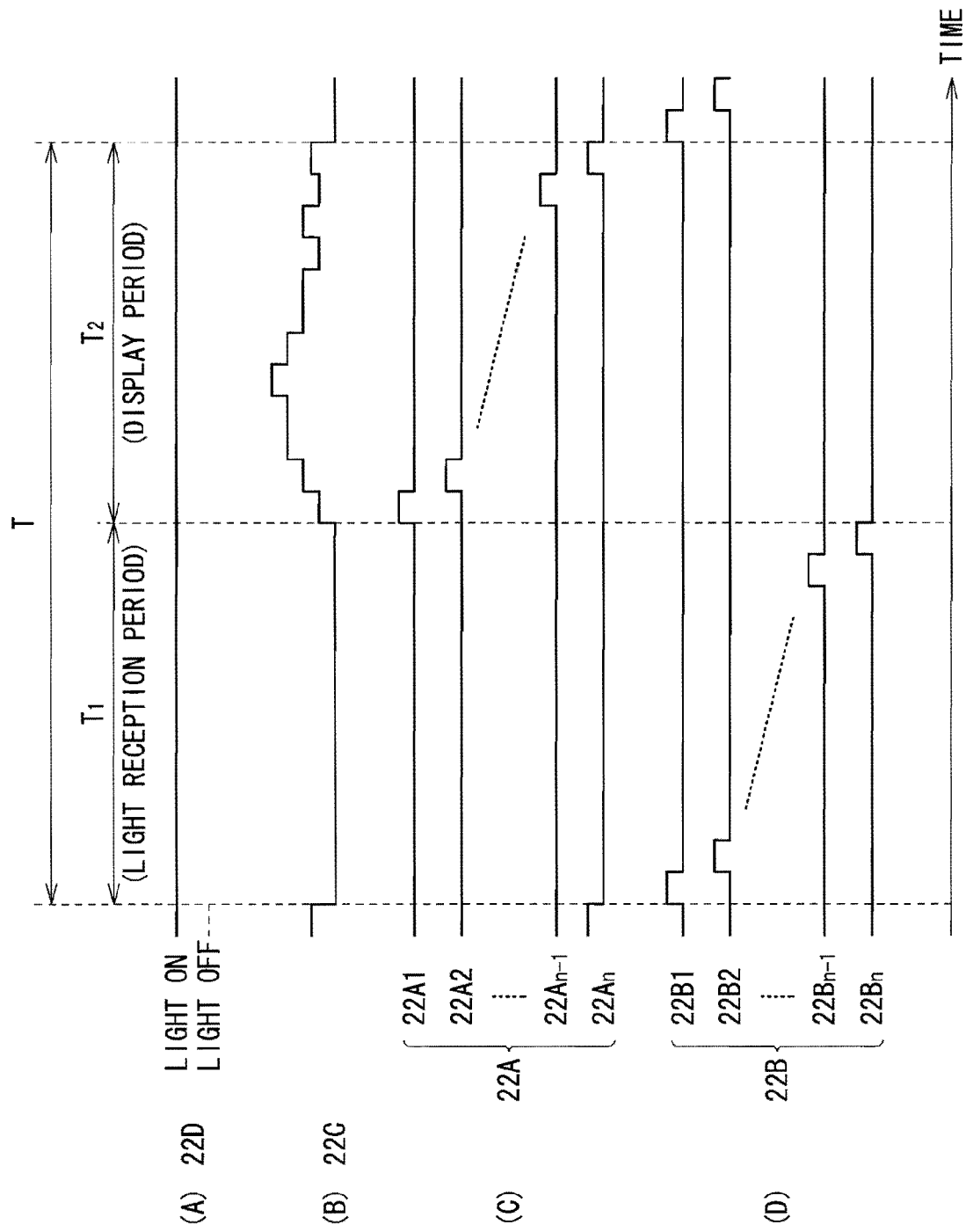
FIG. 6 is a timing chart illustrating another example of the process of detecting an object to be detected by the line-sequential operation.

The display signal holding control unit 22 stores and holds the display signal 21A output from the display signal generating unit 21 every one screen (every one field) in a field memory constructed by an SRAM (Static Random Access Memory) or the like. The display signal holding control unit 22 plays the role of controlling the display signal driver 23 and the light emission scanner 24 for driving the light emission cells 12, the scanner 31 for light reception for driving the light emission cells 13, and the light source 100 (which will be described later) of the display unit 1 operate interlockingly. Concretely, a light emission timing control signal 22A is output to the scanner 24 for light emission. A light reception timing control signal 22B is output to the scanner 31 for light reception. Display signals 22C of one horizontal line based on display signals of one screen held in the field memory are output to the display signal driver 23. More specifically, for example, as illustrated in FIGS. 5 and 6, at the time of displaying an image (moving image or still image) every frame, the display signal holding control unit 22 halves each frame period T. In a first-half period T1 or a latter-half period T2 of the frame period T, in a state where the light source 100 is on, the light emission timing control signal 22A and the display signal 22C are output to synchronously drive the light emission cells 12 every horizontal line in, for example, the arrow X direction (refer to FIG. 1) (line-sequential driving). In the first-half or latter-half period which is the period (non-display period) different from the above-described period (display period), in a state where the light source 100 is on, the light reception timing control signal 22B is output to drive the light reception cells 13 every horizontal line in, for example, the arrow X direction (line-sequential driving). It is unnecessary to drive the light reception cells 13 continuously every frame. As necessary, the light reception cells 13 may be intermittently driven every plural frames.

The display signal driver 23 supplies the display data 20A to a light emission cell 12 to be driven in accordance with the display signals 22C of one horizontal line output from the display signal holding control unit 22. Concretely, the voltage 23A corresponding to the display data 20A is supplied to the light emission cell 12 of the pixel 11 selected by the scanner 24 for light emission via the data supply line DW connected to the pixels 11 of the display unit 1.

The scanner 24 for light emission selects a light emission cell 12 to be driven in accordance with the light emission timing control signal 22B output from the display signal holding control unit 22. Concretely, the scanner 24 for light emission supplies a selection signal 24A for light emission to the visible ray light emission cell 12 to be driven via the gate line GW for light emission connected to the pixels 11 of the display unit 1 to control the light emitting element selection switches SW1R, SW1G, and SW1B. When the voltage for turning on the light emitting element selection switches SW1R, SW1G, and SW1B of a certain pixel 11 is applied to the light emitting element selection switches SW1R, SW1G, and SW1B by the selection signal 24A for light emission, the pixel generates light having luminance corresponding to the voltage 23A supplied from the display signal driver 23. In such a manner, the scanner 24 for light emission and the display signal driver 23 perform line-sequential operation interlockingly, thereby displaying an image corresponding to arbitrary display data on the display unit 1.

The scanner 31 for light reception selects the light reception cell 13 to be driven in accordance with the light reception timing control signal 22B output from the display signal holding control unit 22. Concretely, the scanner 31 for light reception supplies the light reception selection signal 31A to the light reception cell 13 to be driven via the light reception gate line GR connected to the pixels 11 of the display unit 1 to control the light receiving element selection switch SW2, and supplies a reset signal 31B to the light reception cell 13 to be driven via the light reception reset line RR connected to the display unit 1 to control the light emitting element selection switch SW3. That is, when the voltage for turning on the light receiving element selection switch SW3 in a certain pixel 11 is applied to the light receiving element selection switch SW3 by the reset signal 31B, the charges accumulated in the capacitor C in the pixel are reset. When the voltage for turning on the light receiving element selection switch SW2 in a certain pixel 11 is applied by the light reception selection signal 31A to the light receiving element selection switch SW2, charges accumulated in the capacitor C according to the light reception amount in the light receiving element 16 in the pixel 11 are output as a light reception signal 1A to the light reception signal receiver 32 via the buffer amplifier AMP and the data reading line DR. In such a manner, visible light is received by the light reception cell 13.

The scanner 31 for light reception outputs a light reception block control signal 31C to the light reception signal receiver 32 and the light reception signal holding unit 33, and also plays the role of controlling the operations of the part contributing to the light receiving operations.

According to the light reception block control signal 31C output from the scanner 31 for light reception, the light reception signal receiver 32 obtains the light reception signals 1A of one horizontal line output from the light reception cells 13. The light reception signals 1A of one horizontal line obtained in such a manner are output to the light reception signal holding unit 33.

According to the light reception block control signal 31C output from the scanner 31 for light reception, the light reception signal holding unit 33 reconstructs the light reception signal 32A output from the light reception signal receiver 32 to a captured image 33A of every screen (every display of one field), and stores the captured image 33A in a field memory (not illustrated) such as an SRAM. In such a manner, the captured image 33A stored in the field memory is output to the position detector 34. The light reception signal holding unit 33 may have memory elements other than a memory and may hold, for example, the captured image 33A as analog data.

The position detector 34 specifies the position of an object (object to be detected) which comes into contact with or approaches the display surface 10 by performing a predetermined signal process on the captured image 33A output from the light reception signal holding unit 33. In the case where the light reception signal holding unit 33 holds the captured image 33A as analog data, the position detector 34 may execute a signal process after performing analog-digital conversion (A/D conversion).

Figure 7:
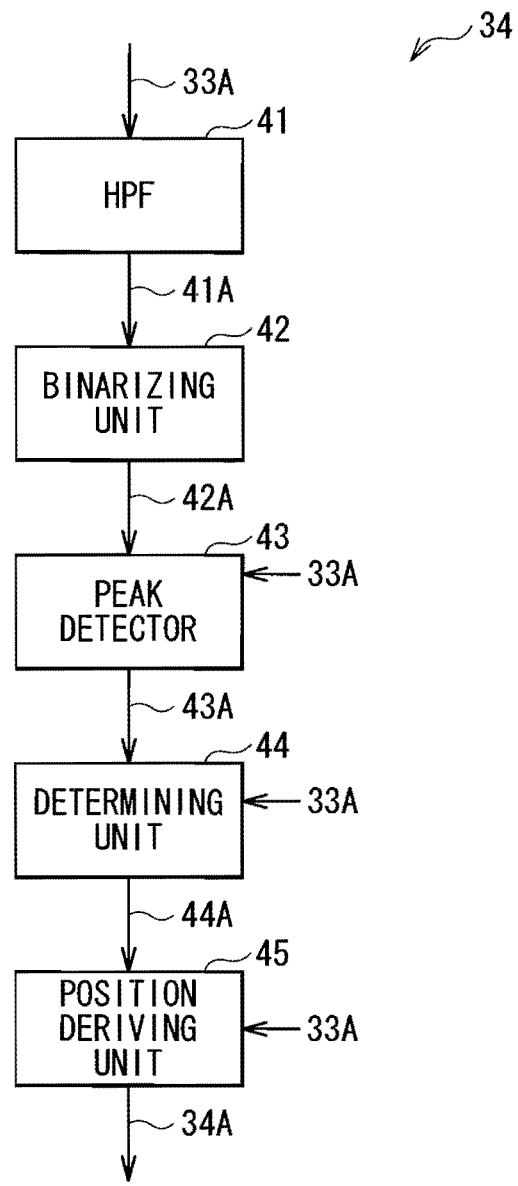
FIG. 7 is a block diagram schematically illustrating an example of the configuration of a position detector in FIG. 1.

FIG. 7 illustrates functional blocks of the position detector 34. As illustrated in FIG. 7, the position detector 34 has an HPF (High Pass Filter) 41, a binarizing unit 42, a peak detector 43, a determining unit 44, and a position deriving unit 45.

When an object (object to be detected) such as a pen comes approaches or comes into contact with the display surface 10, the HPF 41 eliminates an image of a palm (an object which is not to be detected) which approaches or comes into contact with the display surface 10 (an image of a palm (an object which is not to be detected) appearing in the captured image 33A obtained when the object to be detected is in contact with the display surface 10) from the captured image. By passing the captured image through the HPF 41, an HPF image 41A obtained by eliminating the image of the palm (the object which is not to be detected) from the captured image is obtained. It enables to prevent erroneous detection of the palm (the object which is not to be detected) in the determining unit 44. The HPF image 41A obtained as described above is output to the binarizing unit 42.

The binarizing unit 42 generates a mask for extracting a predetermined region in the captured image 33A. The binarizing unit 42 performs the binarizing process on the HPF image 41A by assigning, for example, "1" to a pixel exceeding a predetermined threshold in pixel data of the HPF image 41A and assigning, for example, "0" to a pixel whose value is equal to or less than the predetermined threshold, thereby generating a binary image 42A. Consequently, the peak detector 43 is able to detect peaks efficiently (in short time). The binarizing unit 42 may remove noise in the binary image 42A obtained by the binarizing process as necessary. The noise elimination is performed as follows. For example, when the number of pixels "1" in an isolated region surrounded by the pixels "0" in the binary image 42A is much smaller than the number of pixels included per size expected as that of an image to be detected (an image to be detected appearing in the captured image 33A obtained when the object to be detected is in contact with the display surface 10), "0" is assigned to the pixels included in the isolated region. It enables to prevent erroneous detection of a peak of an object which is not to be detected in the peak detector 43. The binary image 42A generated in such a manner is output to the peak detector 43.

Figure 8:
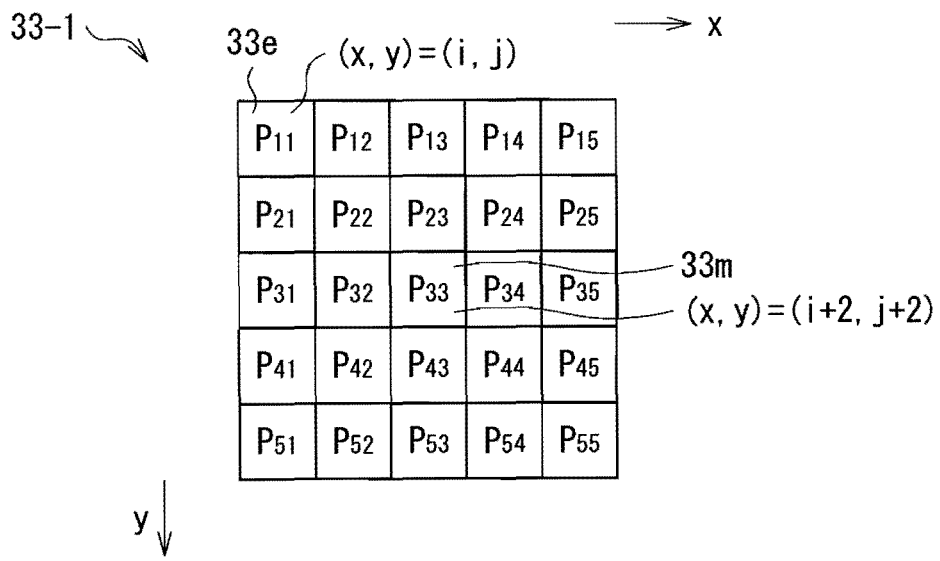
FIG. 8 is a schematic diagram schematically illustrating a state where pixel data of an image extracted from captured images by a peak detector is disposed in a matrix in an xy plane.
Figure 9:
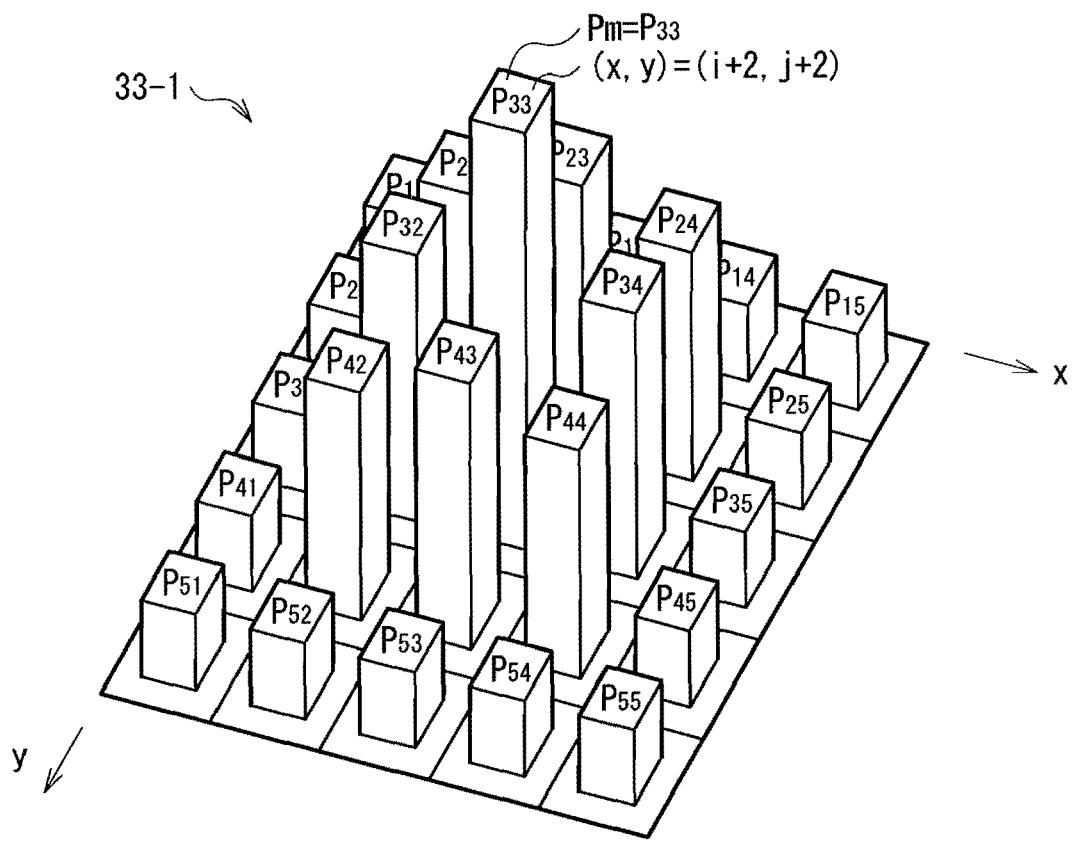
FIG. 9 is a distribution diagram perspectively illustrating an example of a profile of pixel data of an image extracted from captured images by the peak detector.

FIGS. 8 and 9 schematically illustrate an example of pixel data $P_{11}$ to $P_{55}$ of an image 33-1 extracted from the captured image 33A by the peak detector 43. FIG. 8 illustrates a state where the pixel data $P_{11}$ to $P_{55}$ of an image 33-1 is disposed in a matrix in the xy plane. FIG. 9 is a perspective view illustrating the profile of the pixel data $P_{11}$ to $P_{55}$ of an image 33-1. Each of FIGS. 8 and 9 illustrates an image of a region in which coordinates of a pixel 33e closest to the origin of the xy coordinates are (i, j).

The peak detector 43 detects a peak value Pm (the highest value of intensity) from pixel data of the captured image 33A and detects the position of a peak pixel 33m having the peak value Pm. Concretely, the peak detector 43 extracts the image 33-1 of the region corresponding to the opening (for example, the region of "1" surrounded by "0") of the mask from the captured image 33A using the binary image 42A as a mask, detects the peak value Pm (Pm=$P_{33}$ in FIGS. 8 and 9) from the pixel data ($P_{11}$ to $P_{55}$ in FIGS. 8 and 9) of the extracted image 33-1, and detects the position (the xy coordinates (x, y)=(i+2, j+2) of the peak pixel 33m in FIGS. 8 and 9) of the peak pixel 33m having the peak value Pm. The position of the peak pixel 33m generated is output as a peak position information 43A to the determining unit 44.

Figure 10:
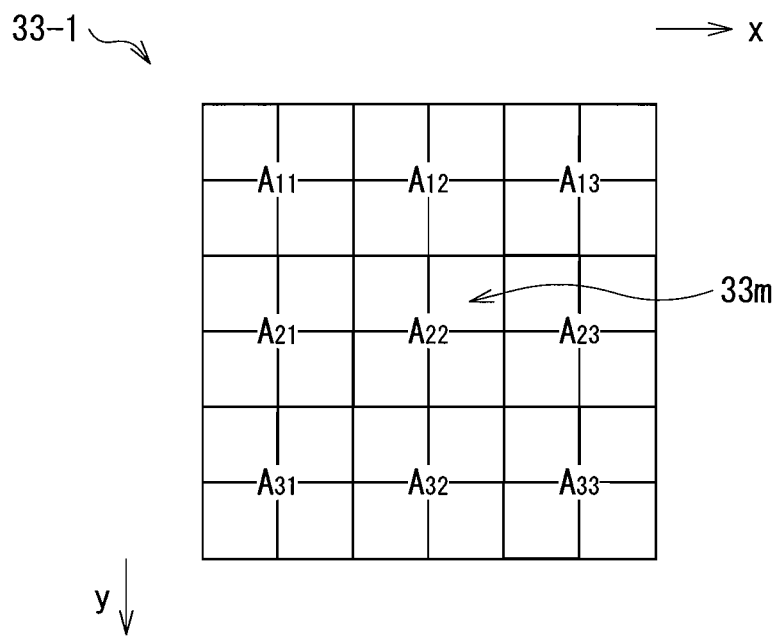
FIG. 10 is a schematic diagram for explaining averaging of all of pixel data included in a captured image every some pixels adjacent to each other.

The peak value Pm and the position of the peak pixel 33m may be detected every pixel of the captured image 33A as described above. Alternatively, for example, as illustrated in FIG. 10, it is also possible to average all of pixel data included in the captured image 33A every pixels adjacent each other, extract the image 33-1 of the region corresponding to the opening (for example, the region of "1" surrounded by "0") from the data obtained by averaging, detect the peak value Pm from the pixel data ($A_{11}$ to $A_{33}$ in FIG. 10) of the extracted image 33-1, and detect the position of the peak pixel 33m having the peak value Pm.

When the position detector 34 assumes the case where a plurality of objects to be detected come into contact with the display surface 10 and a plurality of openings exist in the mask, the peak detector 43 detects the peak value Pm and the position of the peak pixel 33m every image 33-1 of the region corresponding to each of the openings.

The determining unit 44 determines whether an object to be detected is in contact with the display surface 10 or not. For example, as shown by Equation 1, when the difference Δp (which will be described later) between the pixel data (Pm=$P_{33}$ in FIGS. 8 and 9) of the pixel (peak pixel 33m) of the captured image 33A corresponding to the peak position information 43A and the pixel data of a peripheral pixel 33c (which will be described later) of a pixel (peak pixel 33m) of the captured image 33A corresponding to the peak position information 43A is larger than a predetermined threshold TH1 (first threshold), the determining unit 44 determines that the object to be detected is in contact with the display surface 10. When the difference Δp is equal to or less than the threshold TH1, the determining unit 44 determines that an object to be detected is not in contact with the display surface 10. When the determining unit 44 determines that an object to be detected is in contact with the display surface 10, the peak position information 43A at that time is output as the peak position information 44A to the position deriving unit 45. When the determining unit 44 determines that an object to be detected is not in contact with the display surface 10, information indicating that an object to be detected is not in contact with the display surface 10 is output as the peak position information 44A to the position deriving unit 45.

$$\Delta p > TH1 \qquad \text{Equation 1}$$

Figure 11:
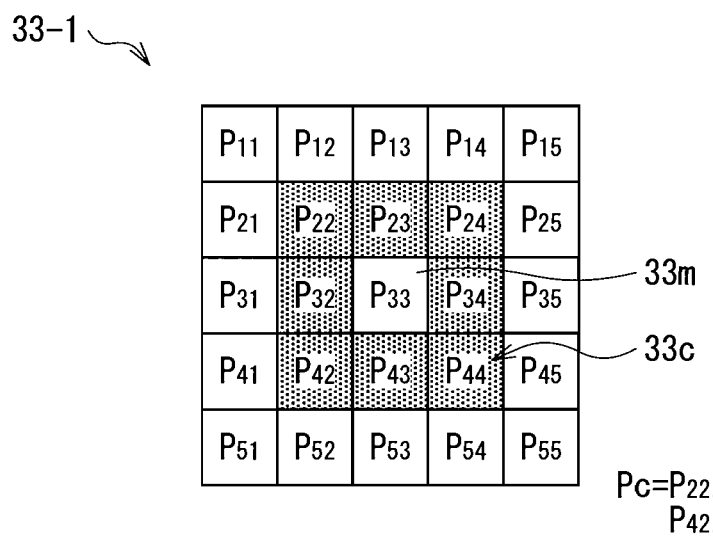
FIG. 11 is a schematic diagram schematically illustrating an example of peripheral pixels.

For example, in the case where the peripheral pixels 33c are all of pixels adjacent to the pixel (peak pixel 33m) corresponding to the peak position information 43A as shaded in FIG. 11, the difference Δp is obtained by subtracting an average value of pixel data Pc (=$P_{22}$, $P_{23}$, $P_{24}$, $P_{32}$, $P_{34}$, $P_{42}$, $P_{43}$, and $P_{44}$) of all of pixels adjacent to the pixel (peak pixel 33m) corresponding to the peak position information 43A from the pixel data Pm (=$P_{33}$) of the pixel (peak pixel 33m) corresponding to the peak position information 43A as shown by Equation 2.

$$\Delta p = P_{33} - (P_{22} + P_{23} + P_{24} + P_{32} + P_{34} + P_{42} + P_{43} + P_{44})/8 \qquad \text{Equation 2}$$

For example, in the case where the peripheral pixels 33c are all of pixels adjacent to the pixel (peak pixel 33m) corresponding to the peak position information 43A as shaded in FIG. 12, the difference Δp is obtained by subtracting an average value of pixel data Pc (=$P_{11}$, $P_{12}$, $P_{13}$, $P_{14}$, $P_{15}$, $P_{21}$, $P_{25}$, $P_{31}$, $P_{35}$, $P_{41}$, $P_{45}$, $P_{45}$, $P_{51}$, $P_{52}$, $P_{53}$, $P_{54}$, and $P_{55}$) of all of pixels adjacent to the pixel (peak pixel 33m) corresponding to the peak position information 43A from the pixel data Pm (=$P_{33}$) of the pixel (peak pixel 33m) corresponding to the peak position information 43A as shown by Equation 3.

$$\Delta p = P_{33} - (P_{11} + P_{12} + P_{13} + P_{14} + P_{15} + P_{21} + P_{25} + P_{31} + P_{35} + P_{41} + P_{45} + P_{51} + P_{52} + P_{53} + P_{54} + P_{55})/16 \qquad \text{Equation 3}$$

For example, in the case where the peripheral pixels 33c are some of pixels adjacent to the pixel (peak pixel 33m) corresponding to the peak position information 43A as shaded in FIG. 13, the difference Δp is obtained by subtracting an average value of pixel data Pc (=$P_{22}$, $P_{24}$, $P_{42}$, and $P_{44}$) of some of pixels (for example, pixels at four corners) adjacent to the pixel (peak pixel 33m) corresponding to the peak position information 43A from the pixel data Pm (=$P_{33}$) of the pixel (peak pixel 33m) as shown by Equation 4.

$$\Delta p = P_{33} - (P_{22} + P_{24} + P_{42} + P_{44})/4 \quad \text{Equation 4}$$

Figure 14:
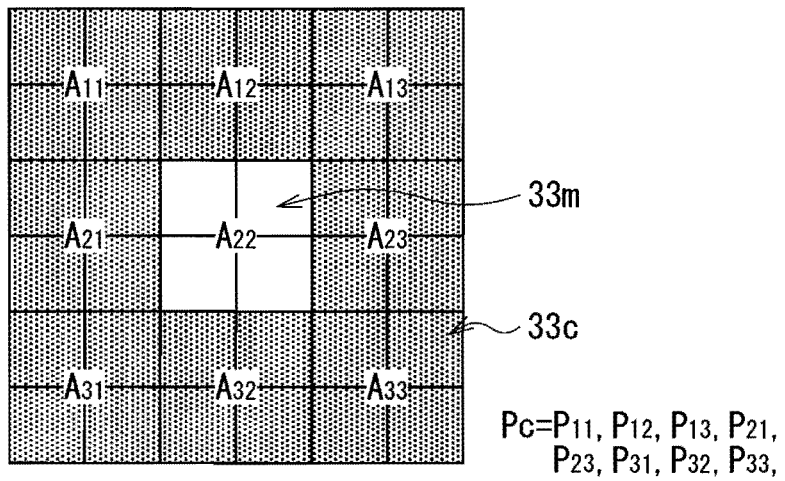
FIG. 14 is a schematic diagram schematically illustrating still another example of the peripheral pixels.

For example, as illustrated in FIG. 10, in the case of detecting the peak value Pm from the average values ($A_{11}$ to $A_{33}$) and detecting the position of the peak pixel 33m having the peak value Pm, when the peripheral pixels 33c are all of pixels adjacent to the pixel (peak pixel 33m) corresponding to the peak position information 43A as shaded in FIG. 14, the difference Δp is obtained by subtracting an average value of pixel data Pc (=$A_{11}$, $A_{12}$, $A_{13}$, $P_{21}$, $A_{23}$, $A_{31}$, $A_{32}$, and $A_{33}$) of all of pixels adjacent to the pixel (peak pixel 33m) corresponding to the peak position information 43A from the pixel data Pm (=$A_{22}$) of the pixel (peak pixel 33m) corresponding to the peak position information 43A as shown by Equation 5.

$$\Delta p = P_{33} - (A_{11} + A_{12} + A_{13} + P_{21} + A_{23} + A_{31} + A_{32} + A_{33})/8 \quad \text{Equation 5}$$

Figure 15A:
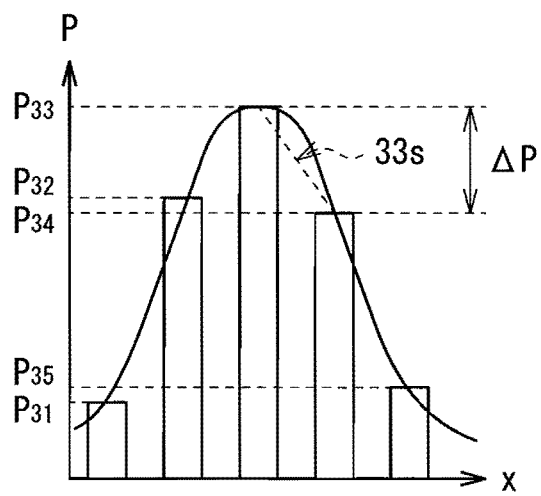
FIGS. 15A and 15B are distribution diagrams illustrating an example of a profile at y=3 in the profile illustrated in FIG. 9.
Figure 15B:
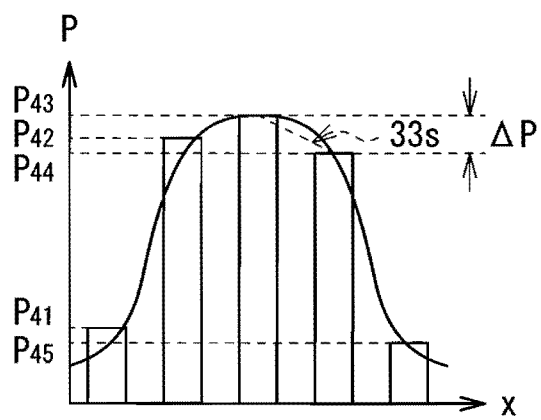

For example, as illustrated in FIGS. 15A and 15B, the magnitude of the difference Δp is proportional to the magnitude of a tilt (peak peripheral tilt 33s) of pixel data between the pixel (peak pixel 33m) corresponding to the peak position information 43A and the peripheral pixel 33c of the pixel (peak pixel 33m) corresponding to the peak position information 43A. The magnitude of the peak peripheral tilt 33s is inversely proportional to the size of an image to be detected which is in contact with the display surface 10 (an image to be detected appearing in the captured image 33A obtained when the object to be detected is in contact with the display surface 10). Consequently, when the image of the object to be detected which is in contact with the display surface 10 is large, the difference Δp is small. When the image of the object to be detected which is in contact with the display surface 10 is small, the difference Δp is large. Therefore, by properly setting the threshold TH1 in accordance with the size expected as that of an image of the object to be detected, whether the object to be detected is in contact with the display surface 10 or not is determined from the relation between the difference Δp and the threshold TH1.

When the difference Δp is larger than a predetermined threshold TH2 (>TH1) as shown by Equation 6, the determining unit 44 may detect that an object to be detected is not in contact with the display surface 10.

$$TH1 < \Delta p < TH2 \quad \text{Equation 6}$$

By properly setting the threshold TH2, in the case where noise eliminating process is not performed in the binarizing unit 42 or in the case such that, although the noise eliminating process is performed, noise remains in the binary image 42A, erroneous determination of whether an object which is not to be detected is in contact with the display surface 10 or not due to the influence of the noise is prevented.

For example, as shown in Equation 7, when a value (Pm/Δp) obtained by multiplying the inverse (1/Δp) of the difference Δp between the pixel data Pm of the pixel (peak pixel 33m) corresponding to the peak position information 43A and the pixel data Pc of the peripheral pixel 33c of the pixel (peak pixel 33m) corresponding to the peak position information 43A with the pixel data Pm of a pixel (peak pixel 33m) corresponding to the peak position information 43A is larger than a predetermined threshold TH3 (first threshold), the determining unit 44 may determine that an object to be detected is in contact with the display surface 10. When the difference Δp is equal to or less than the threshold TH3, the determining unit 44 may determine that the object to be detected is not in contact with the display surface 10.

$$Pm/\Delta p > TH3 \quad \text{Equation 7}$$

In this case as well, the pixels illustrated in FIGS. 11 to 14 may be selected as the peripheral pixels 33c. In the case where Pm/Δp is larger than a predetermined threshold TH4 larger than the threshold TH3 as shown in Equation 8, it may be determined that an object to be detected is not in contact with the display surface 10.

$$TH3 < Pm/\Delta p < TH4 \quad \text{Equation 8}$$

Figure 16:
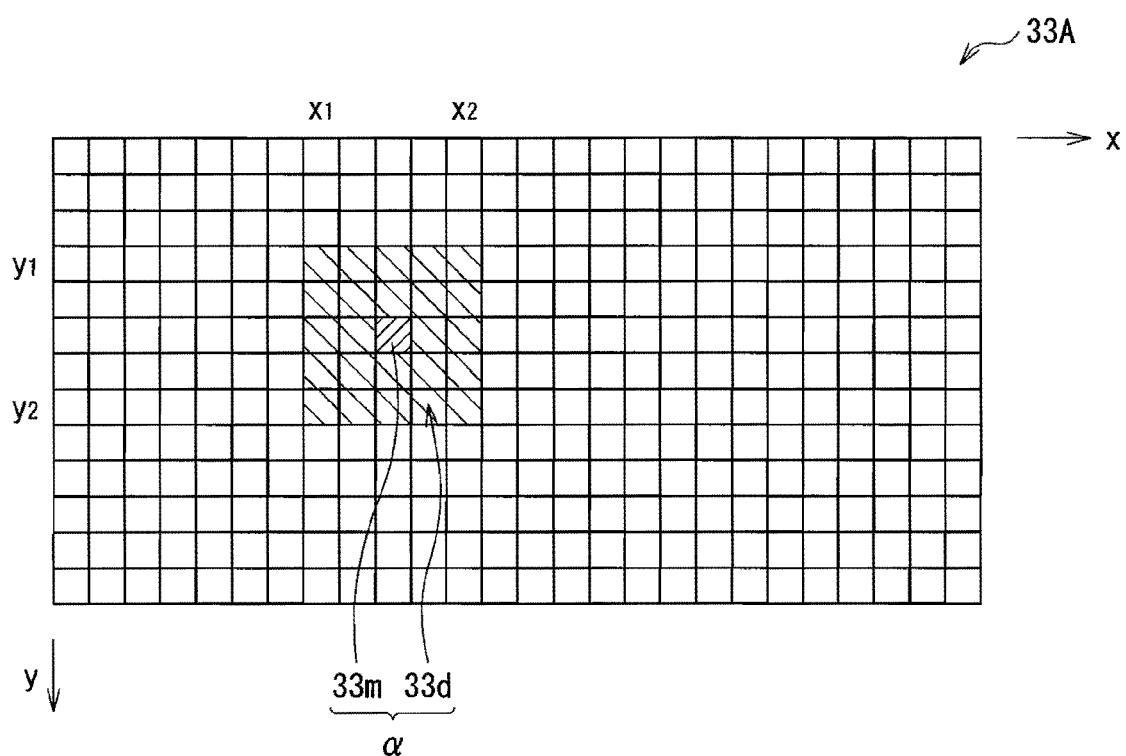
FIG. 16 is a schematic diagram schematically illustrating a pixel region used at the time of detecting a center-of-gravity position.

The position deriving unit 45 derives the position on the display surface 10, of an object to be detected which is in contact with the display surface 10 using a detection result and a determination result of the determining unit 44. For example, as illustrated in FIG. 16 and shown in Equations 9 and 10, the position deriving unit 45 detects a center-of-gravity position (Xg, Yg) in a pixel region α including the pixel (peak pixel 33m) of the captured image 33A corresponding to the peak position information 44A when the determining unit 44 determines that an object to be detected is in contact with the display surface 10 and a peripheral pixel 33d of the pixel (peak pixel 33m) in the captured image 33A corresponding to the peak position information 44A, and derives the position on the display surface 10, of the object to be detected which is in contact with the display surface 10. The position information derived in such a manner is output as the position information 34A to the controller 20.

$$X_g = \frac{\sum_{y=y_1}^{y=y_2} \sum_{x=x_1}^{x=x_2} X \cdot P_{xy}}{\sum_{y=y_1}^{y=y_2} \sum_{x=x_1}^{x=x_2} P_{xy}} \quad \text{Equation 9}$$

$$Y_g = \frac{\sum_{y=y_1}^{y=y_2} \sum_{x=x_1}^{x=x_2} Y \cdot P_{xy}}{\sum_{y=y_1}^{y=y_2} \sum_{x=x_1}^{x=x_2} P_{xy}} \quad \text{Equation 10}$$

Pxy denotes pixel data (luminance value) in the coordinates (x, y) of the captured image 33A. $X_1$ denotes the minimum value of the x coordinates in the pixel region α, and $X_2$ denotes the maximum value of the x coordinates in the pixel region α. $Y_1$ denotes the minimum value of the y coordinates in the pixel region α, and $Y_2$ denotes the maximum value of the y coordinates in the pixel region α.

Next, an example of the operation of the display apparatus of the embodiment will be described in detail.

In the display apparatus, drive signals for display (voltage 23A and the light emission selection signal 24A) are generated from the display signal driver 23 and the scanner 24 for light emission on the basis of the display data 20A supplied from the controller 20. By the drive signals, the line-sequential display drive is performed in the display unit 1. An image is displayed, a drive signal for light reception (light reception selection signal 31A) is generated from the scanner 31 for light reception and, by the drive signal, the line-sequential light reception drive is performed in the display unit 1, and an image is captured.

Concretely, for example, as illustrated in FIG. 5, at the time of displaying an image every frame, each of the frame periods is halved. In a first-half period T1, a signal for turning on the light source 100 is output as the light source control signal 22D to turn on the whole light source 100. In the light-on period (display period), drive signals for display (the voltage 23A and the light emission selection signal 24A) are output. The light emission cell 12 and the light reception cells 13 are driven (line-sequentially driven), for example, in the arrow X direction (refer to FIG. 1) synchronously every horizontal line, and an image in the frame period is displayed. Further, in a latter-half period T2 of each of the frame periods, a signal for turning on the light source 100 is output as the light source control signal 22D to turn on the whole light source 100. In the light-on period (light reception period), a drive signal for light reception (the light emission selection signal 31A) is output. The light reception cells 13 are driven (line-sequentially driven), for example, in the arrow X direction, thereby obtaining the captured image 33A in the latter-half period T2. In the case where the light reception cells 13 are driven intermittently every plural frames, the captured image 33A is obtained only by the frame period in which the light reception cells 13 are driven.

In the position detector 34, signal process is performed on the basis of the captured image 33A output from the light reception signal holding unit 33, and the position of an object (object to be detected) which comes into contact with or approaches the display surface 10 is specified.

Concretely, first, the HPF 41 eliminates an image of a palm (an object which is not to be detected) from the captured image 33A, thereby generating the HPF image 41A. Subsequently, the binarizing unit 42 performs the binarizing process on the HPF image 41A, thereby generating the binary image 42A. Further, as necessary, noise in the binary image 42A is removed. Next, using the binary image 42A as a mask, the image 33-1 of the region corresponding to the opening of the mask is extracted from the captured image 33A. The peak value Pm is detected from pixel data of the extracted image 33-1, and the position of the peak pixel 33$m$ having the peak value Pm is detected. The determining unit 44 determines whether an object to be detected is in contact with the display surface 10 or not. For example, as shown by Equation 1, when the difference Δp is larger than the threshold TH1, the determining unit 44 determines that the object to be detected is in contact with the display surface 10. When the difference Δp is equal to or less than the threshold TH1, the determining unit 44 determines that an object to be detected is not in contact with the display surface 10. For example, as shown in Equation 7, when Pm/Δp is larger than the threshold TH3, the determining unit 44 determines that an object to be detected is in contact with the display surface 10. When the difference Pm/Δp is equal to or less than the threshold TH3, the determining unit 44 determines that the object to be detected is not in contact with the display surface 10. Further, as necessary, when the difference Δp is larger than the predetermined threshold TH2 as shown by Equation 6, the determining unit 44 determines that an object to be detected is not in contact with the display surface 10. For example, in the case where Pm/Δp is larger than the threshold TH4 as shown in Equation 8, it is determined that an object to be detected is not in contact with the display surface 10. The position deriving unit 45 derives the position on the display surface 10, of an object to be detected which is in contact with the display surface 10 using a detection result and a determination result of the determining unit 44. For example, the position deriving unit 45 detects a center-of-gravity position (Xg, Yg) in the pixel region α as illustrated in FIG. 16 and shown in Equations 9 and 10 and, from the center-of-gravity position (Xg, Yg), derives the position on the display surface 10, of the object to be detected which is in contact with the display surface 10. The controller 20 generates the display data 20A including the position information 34A on the display surface 10 derived by the position deriving unit 45. The display signal driver 23 supplies the voltage 23A corresponding to the display data 20A to the light emission cell 12 of the pixel 11 selected by the scanner 24 for light emission. As a result, a line of touching the display surface with an object to be detected such as a pen is displayed in a real-time manner on the display surface 10. In such a manner, in the embodiment, by skimming the display surface 10 with the object to be detected such as a pen, a character, a picture, or the like is able to be written on the display surface 10.

As described above, in the embodiment, an image is captured in a light reception period when display of an image and light reception are sequentially performed in one frame period, and the difference Δp is obtained from the captured image 33A. On the basis of the relation between the difference Δp and the threshold TH1 or the relation between Pm/Δp and the threshold TH3, whether an object to be detected is in contact with the display surface 10 or not is determined. Even if the object to be detected is a fine-tipped object such as a pen, the position on the display surface 10, of the object to be detected is able to be easily detected. As a result, it becomes unnecessary to use a special pen whose tip is deformed and whose contact area changes when the pen comes into contact with the display surface 10. Therefore, without deteriorating simplicity, a character or a picture is able to be written by touching the display surface 10 with a fine-tipped object such as a pen.

In the embodiment, in the case of deriving the position on the display surface 10, of an object to be detected which is in contact with the display surface 10 from the center-of-gravity position (Xg, Yg), as compared with the case of deriving the position on the display surface 10, of the object to be detected which is in contact with the display surface 10 from the pixel (peak pixel 33$m$) corresponding to the peak position information 44A, the position on the display surface 10, of the object to be detected which is in contact with the display surface 10 is able to be obtained more precisely.

In the embodiment, in the case of deriving the position on the display surface 10, of an object to be detected which is in contact with the display surface 10 by using a part (pixel region α) of pixel data of the captured image 33A, as compared with the case of using all of pixel data of the captured image 33A, the processing speed is able to be increased.

In the embodiment, to detect the position or the like of an object (an object to be detected), it is unnecessary to separately provide a part such as a touch panel. Therefore, the configuration of the display apparatus is able to be simplified.

In the embodiment, in the case of intermittently driving the light reception cells 13 every plural frames, power consumption necessary for detecting the position or the like of an object (object to be detected) is able to be suppressed.

Modifications of First Embodiment

Figure 17:
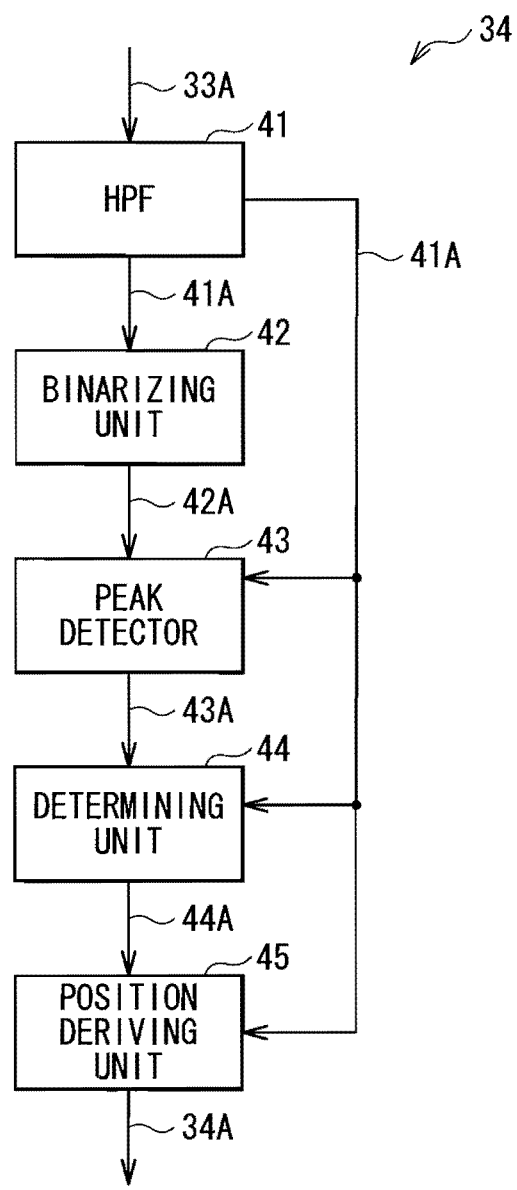
FIG. 17 is a block diagram schematically illustrating another example of the configuration of the position detector of FIG. 1.

In the foregoing embodiment, the peak detector 43 detects the peak value Pm from the pixel data of the captured image 33A and detects the position of the peak pixel 33$m$ having the peak value Pm. As illustrated in FIG. 17, the peak detector 43 may obtain the HPF image 41A in place of the captured image 33A and detect the peak value Pm and the position of the peak pixel 33$m$ from the pixel data of the obtained HPF image 41A. In this case, it is also possible to average all of pixel data included in the HPF image 41A every some pixels adjacent each other, extract the image 33-1 of the region corresponding to the opening in the mask (for example, the region of "1" surrounded by "0") from the data obtained by averaging, detect the peak value Pm from the pixel data ($A_{11}$ to $A_{33}$ in FIG. 10) of the extracted image 33-1, and detect the position of the peak pixel 33m having the peak value Pm.

In the embodiment, the case where the determining unit 44 determines whether an object to be detected is in contact with the display surface 10 or not on the basis of the relation between the difference Δp in the captured image 33A and the threshold TH1 has been described. As illustrated in FIG. 17, it is also possible to obtain the HPF image 41 in place of the captured image 33A and determine whether an object to be detected is in contact with the display surface 10 or not on the basis of the relation between the difference Δp in the obtained HPF image 41A and the threshold TH1.

In the embodiment, the position deriving unit 45 detects the center-of-gravity position (Xg, Yg) in the pixel region α including the pixel (peak pixel 33m) of the captured image 33A corresponding to the peak position information 44A when the determining unit 44 determines that an object to be detected is in contact with the display surface 10 and a peripheral pixel 33d of the pixel (peak pixel 33m) in the captured image 33A corresponding to the peak position information 44A. Alternatively, as illustrated in FIG. 17, the position deriving unit 45 may detect the center-of-gravity position (Xg, Yg) in the pixel region α including the pixel (peak pixel 33m) of the HPF image 41A corresponding to the peak position information 44A when the determining unit 44 determines that an object to be detected is in contact with the display surface 10 and a peripheral pixel 33d of the pixel (peak pixel 33m) in the HPF image 41A corresponding to the peak position information 44A.

Figure 18:
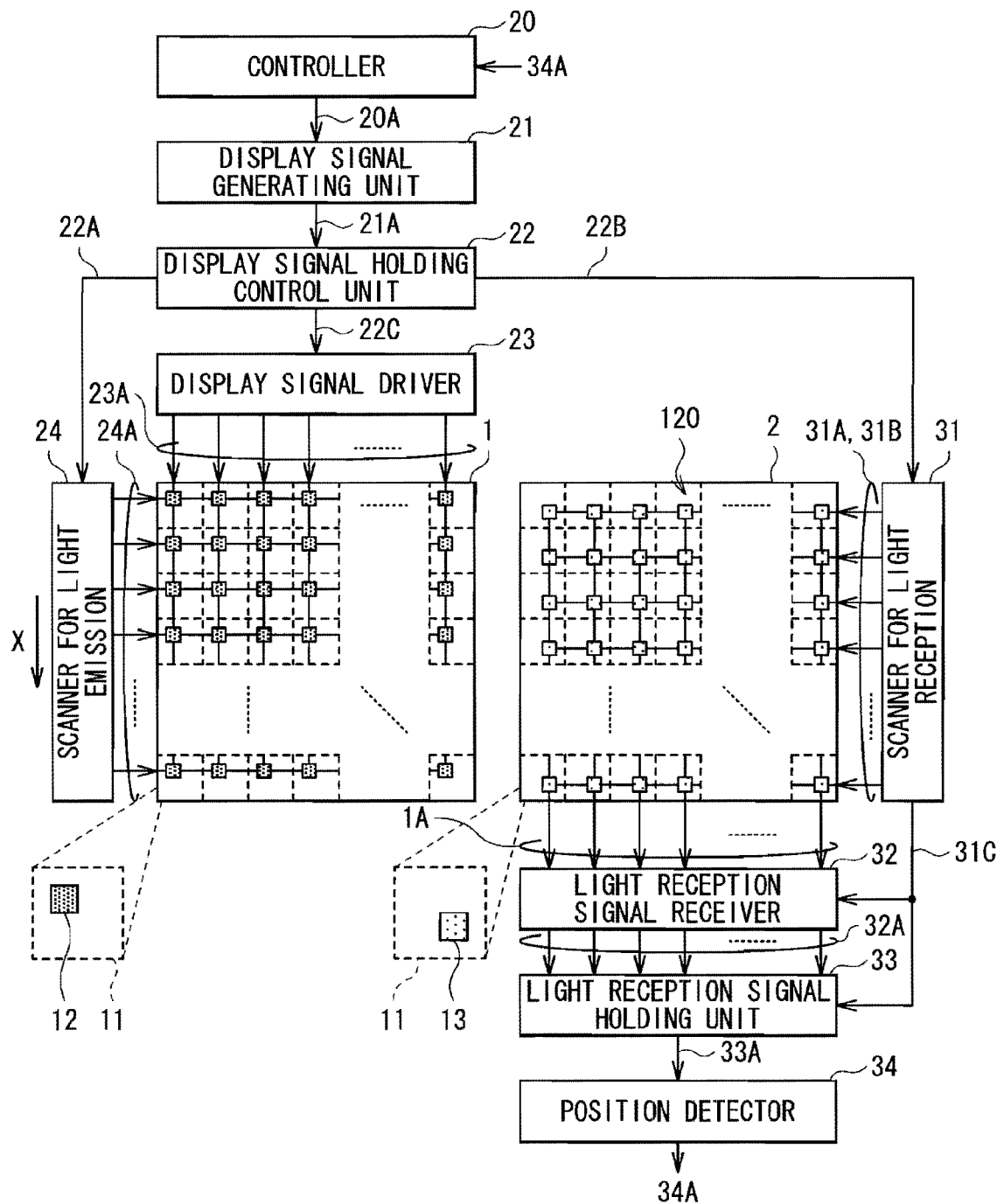
FIG. 18 is a block diagram illustrating a modification of the display apparatus of FIG. 1.
Figure 19:
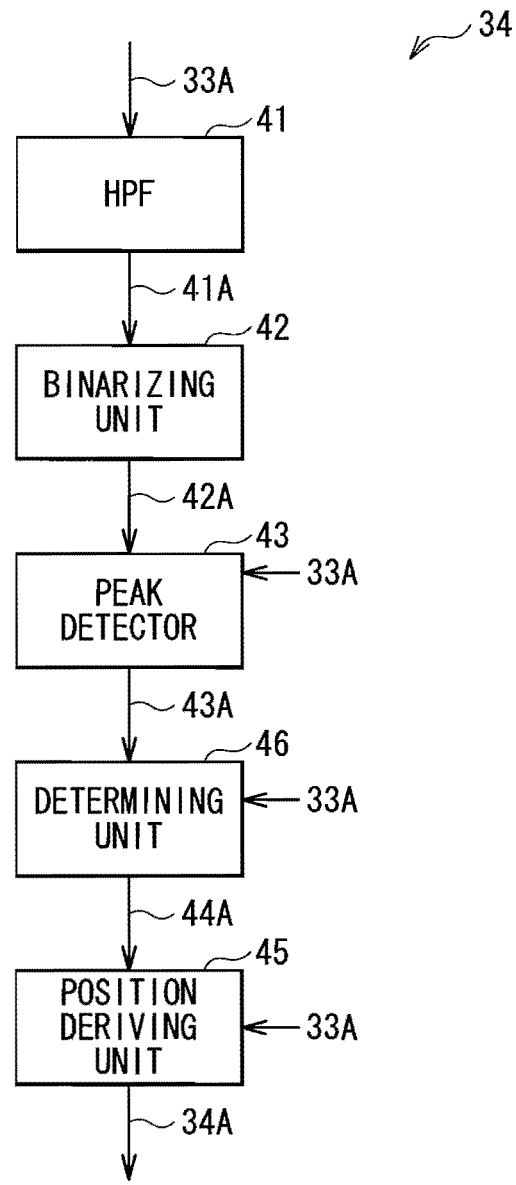
FIG. 19 is a block diagram schematically illustrating an example of the configuration of a position detector in a display apparatus according to a second embodiment.

In the foregoing embodiment, the display unit 1 has the light emission cell 12 constructed by the red light emission cell 12R, the green light emission cell 12G, and the blue light emission cell 12B in each of the pixels 11. The display unit 1 may further include a cell for emitting another color or may not have the light emission cells as illustrated in FIG. 18. In the case where the display unit 1 has no light emission cell in each of the pixels 11, for example, as illustrated in FIG. 18, a display unit 2 having a panel unit 120 (second panel unit) including a light emission cell 12 in each of the pixels 11 is provided separately from the display unit 1, an output (the light reception selection signal 31A and the reset signal 31B) of the scanner 31 for light reception is input to the display unit 2 and, further, an output (light reception signal 1A) of the display unit 2 is input to the light reception signal receiver 32.

Second Embodiment

A display apparatus according to a second embodiment is similar to the display apparatus of the foregoing embodiment except that a determining unit 46 is provided in place of the determining unit 44. The points different from the foregoing embodiment will be mainly described, and the points common to the foregoing embodiment will not be repeated.

The determining unit 46 determines whether an object to be detected is in contact with the display surface 10 or not. The determining unit 46 determines that an object to be detected is in contact with the display surface 10, as illustrated in FIG. 20 and shown in Equation 11, when the number of pixels (exceeding number N1, N1=9 in FIG. 20) whose pixel data values exceed a predetermined threshold TH5 (first threshold) in a pixel region including the pixel (the peak pixel 33m) of the captured image 33A corresponding to the peak position information 43A and the peripheral pixels 33c of the pixel (the peak pixel 33m) of the captured image 33A corresponding to the peak position information 43A is equal to or larger than the number (expected number N2) of the light reception cells 13 included per size expected as that of an image of the object to be detected. The determining unit 46 determines that an object to be detected is not in contact with the display surface 10 when the exceeding number N1 is below the expected number N2. When it is determined that the object to be detected is in contact with the display surface 10, the peak position information 43A is output as the peak position information 44A to the position deriving unit 45. When it is determined that the object to be detected is not in contact with the display surface 10, information indicating that the object to be detected is not in contact with the display surface is output as the peak position information 44A to the position deriving unit 45. The peripheral pixel 33c may be selected in a manner similar to FIGS. 11 to 14.

$$N1 \geq N2 \qquad \text{Equation 11}$$

The expected number N2 is proportional to the size of an image to be detected which is in contact with the display surface 10 (an image to be detected appearing in the captured image obtained when the object to be detected is in contact with the display surface 10). When the image of the object to be detected which is in contact with the display surface 10 is large, the expected number N2 is large. When the image of the object to be detected which is in contact with the display surface 10 is small, the expected number N2 is also small. Therefore, by properly setting the expected number N2 and the threshold TH5 in accordance with an expected size of an image of the object to be detected, whether the object to be detected is in contact with the display surface 10 or not is able to be determined from the relation between the exceeding number N1 and the expected number N2.

In the display apparatus, the determining unit 46 determines whether the object to be detected is in contact with the display surface 10 or not. For example, as shown by the Equation 11, when the exceeding number N1 is equal to or larger than the expected number N2, the determining unit 46 determines that the object to be detected is in contact with the display surface 10. When the exceeding number N1 is below the expected number N2, the determining unit 46 determines that the object to be detected is not in contact with the display surface 10. Consequently, even when the object to be detected is a fine-tipped object such as a pen, the position on the display surface 10, of the object to be detected which is in contact is able to be easily detected. It becomes unnecessary to use a special pen whose tip is deformed and whose contact area changes when the pen comes into contact with the display surface 10. Therefore, without deteriorating simplicity, a character or a picture can be written by touching the display surface 10 with a fine-tipped object such as a pen.

Modifications of Second Embodiment

Figure 21:
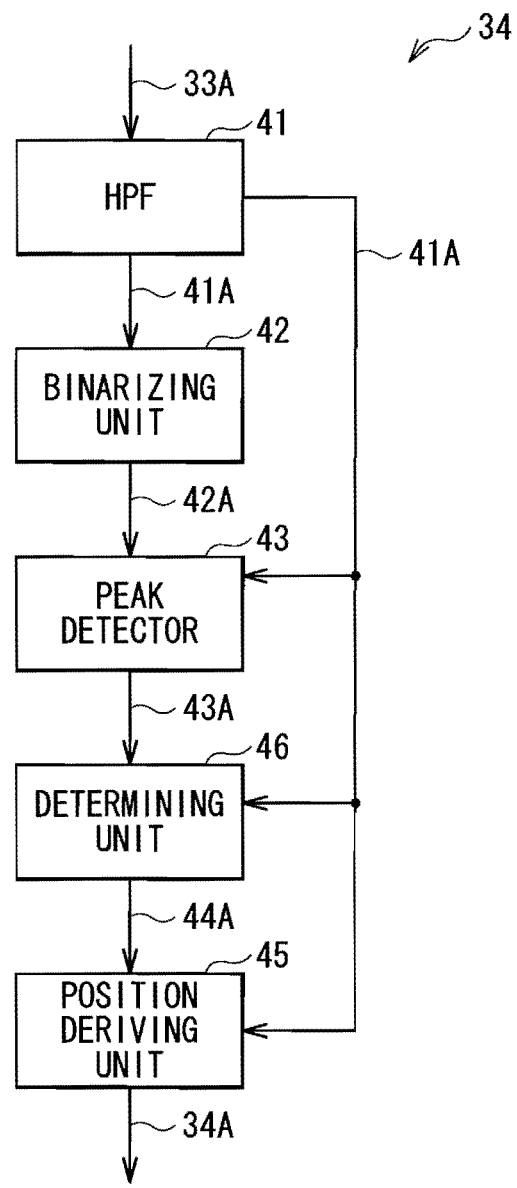
FIG. 21 is a block diagram schematically illustrating another example of the configuration of the position detector in FIG. 19.

In the second embodiment, the case where the determining unit 46 determines whether the object to be detected is in contact with the display surface 10 or not on the basis of the relation between the exceeding number N1 in the captured image 33A and the expected number N2 has been described. As illustrated in FIG. 21, it is also possible to obtain the HPF image 41A in place of the captured image 33A and determine whether or not the object to be detected is in contact with the display surface 10 on the basis of the relation between the exceeding number N1 and the expected number N2 in the obtained HPF image 41A.

The second embodiment may be also similarly modified in a manner similar to the first embodiment.

The present application has been described by the embodiments and the modifications. The application, however, is not limited to the embodiments and the like but may be variously modified.

For example, in the foregoing embodiment, each of the pixels 11 has the light emission cell 12 constructed by the red light emission cell 12R, the green light emission cell 12G, and the blue light emission cell 12B. Each of the pixels 11 may have a cell of another color. Each of the pixels 11 may have at least one of the light emission cells.

In the embodiments, the case where the display unit 1 has a liquid crystal display panel (panel unit 110) on the light source 100 has been described. The display unit 1 may have a light-emitting panel in which display elements themselves constructing pixels emit light like an organic EL panel having an organic layer between transparent substrates facing each other. In this case, light entering from the display surface 10 side in the light reception period is only external light. It is consequently preferable to use an image obtained by inverting the light and dark of the captured image 33A in the position detector 34.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display apparatus performing display of an image and light reception simultaneously or alternately, comprising:
   a light source emitting a backlight to a display surface;
   a panel unit having a plurality of pixels, each pixel including a light emission cell emitting light to display an image on the display surface and a light reception cell receiving light which is emitted from the light source, is reflected by an object to be detected coming into contact with or approaching the display surface, and enters from the display surface side; and
   a position detector for specifying the position of the object to be detected, the position detector comprising:
   a peak detector generating a binary image by performing a binarizing process on an HPF (High Pass Filter) image generated by passing the captured image, which is captured from the plurality of light reception cells, through an HPF, extracting an image of a predetermined region from the captured image or the HPF image using the binary image as a mask, detecting the peak value from pixel data of the extracted image, and detecting position of a peak pixel having the peak value,
   a determining unit calculating a pixel data difference by subtracting, from the pixel data of the peak pixel, an average value of pixel data of the predetermined peripheral pixels around the peak pixel, comparing the pixel data difference with a first threshold, determining that the object to be detected is in contact with the display surface when the pixel data difference is larger than a first threshold, and determining that the object to be detected is not in contact with the display surface when the pixel data difference is equal to or less than the first threshold, and
   a position deriving unit deriving position on the display surface, of the object to be detected which is in contact with the display surface using a detection result and a determination result in the determining unit.

2. The display apparatus according to claim 1, wherein the peak detector averages all of pixel data included in an image captured from the plurality of light reception cells or an image obtained by performing a predetermined process on the captured image every some neighboring pixels, detects a peak value from data obtained by the averaging, and detects a pixel position corresponding to the peak value.

3. The display apparatus according to claim 1, wherein the determining unit derives the difference between pixel data of the peak pixel and pixel data of peripheral pixels of the peak pixel by using the captured image or an HPF (High Pass Filter) image obtained by passing the captured image through an HPF.

4. The display apparatus according to claim 1, wherein the position deriving unit detects a center-of-gravity position in a pixel region including a peak pixel when the determining unit determines that an object to be detected is in contact with the display surface and peripheral pixels of the peak pixel, and, from the center-of-gravity position, derives the position on the display surface, of the object to be detected which is in contact with the display surface.

5. The display apparatus according to claim 1 further comprising a light emission cell driving unit for applying a voltage according to display data including position information on the display surface derived by the position deriving unit to the light emission cells.

6. A display apparatus performing display of an image and light reception simultaneously or alternately, comprising:
   a light source emitting a backlight to a display surface,
   a panel unit having a plurality of pixels, each pixel including a light emission cell emitting light to display an image on the display surface and a light reception cell receiving light which is emitted from the light source, is reflected by an object to be detected coming into contact with or approaching the display surface, and enters from the display surface side, the pixels disposed so that the number of light reception cells included per size expected as that of an image of an object to be detected is at least four and receiving light entering from the display surface side; and
   a position detector for specifying the position of the object to be detected, the position detector comprising:
   a peak detector generating a binary image by performing a binarizing process on an HPF (High Pass Filter) image generated by passing the captured image, which is captured from the plurality of light reception cells, through an HPF, extracting an image of a predetermined region from the captured image or the HPF image using the binary image as a mask, detecting the peak value from pixel data of the extracted image, and detecting position of a peak pixel having the peak value,
   a determining unit calculating a pixel data difference by subtracting, from the pixel data of the peak pixel, an average value of pixel data of the predetermined peripheral pixels around the peak pixel, comparing the pixel data difference with a first threshold, determining that the object to be detected is in contact with the display surface when the pixel data difference is larger than a first threshold, and determining that the object to be detected is not in contact with the display surface when the pixel data difference is equal to or less than the first threshold, and
   a position deriving unit deriving position on the display surface, of the object to be detected which is in contact with the display surface using a detection result and a determination result in the determining unit.

7. An image pickup apparatus comprising:
a light source emitting a backlight to a display surface;
a first panel unit having a plurality of pixels, each pixel including a light reception cell receiving light which is emitted from the light source, is reflected by an object to be detected coming into contact with or approaching the display surface, and enters from a contact surface side; and
a position detector for specifying the position of the object to be detected which comes into contact with or approaches the display surface, the position detector comprising:
a peak detector generating a binary image by performing a binarizing process on an HPF (High Pass Filter) image generated by passing the captured image, which is captured from the plurality of light reception cells, through an HPF, extracting an image of a predetermined region from the captured image or the HPF image using the binary image as a mask, detecting the peak value from pixel data of the extracted image, and detecting position of a peak pixel having the peak value,
a determining unit calculating a pixel data difference by subtracting, from the pixel data of the peak pixel, an average value of pixel data of the predetermined peripheral pixels around the peak pixel, comparing the pixel data difference with a first threshold, determining that the object to be detected is in contact with the contact surface when the pixel data difference is larger than a first threshold, and determining that the object to be detected is not in contact with the contact surface when the pixel data difference is equal to or less than the first threshold, and
a position deriving unit deriving position on the display surface, of the object to be detected which is in contact with the contact surface using a detection result and a determination result in the determining unit.

8. The image pickup apparatus according to claim 7, further comprising:
a second panel unit having a plurality of light emission cells emitting light to display an image on the display surface; and
a light emission cell driving unit applying a voltage according to display data including the position information on the contact surface derived by the position deriving unit to the light emission cells.

9. An image pickup apparatus comprising:
a light source emitting a backlight to a display surface;
a first panel unit having a plurality of pixels, each pixel including a light reception cell receiving light which is emitted from the light source, is reflected by an object to be detected coming into contact with or approaching the display surface, and enters from a contact surface side, the pixels disposed so that the number of light reception cells included per size expected as that of an image of an object to be detected is at least four; and
a position detector for specifying the position of the object to be detected which comes into contact with or approaches the display surface, the position detector comprising:
a peak detector generating a binary image by performing a binarizing process on an HPF (High Pass Filter) image generated by passing the captured image, which is captured from the plurality of light reception cells, through an HPF, extracting an image of a predetermined region from the captured image or the HPF image using the binary image as a mask, detecting the peak value from pixel data of the extracted image, and detecting position of a peak pixel having the peak value,
a determining unit calculating a pixel data difference by subtracting, from the pixel data of the peak pixel, an average value of pixel data of the predetermined peripheral pixels around the peak pixel, comparing the pixel data difference with a first threshold, determining that the object to be detected is in contact with the contact surface when the pixel data difference is larger than a first threshold, and determining that the object to be detected is not in contact with the contact surface when the pixel data difference is equal to or less than the first threshold, and
a position deriving unit deriving position on the display surface, of the object to be detected which is in contact with the contact surface using a detection result and a determination result in the determining unit.

10. The image pickup apparatus according to claim 9, further comprising:
a second panel unit having a plurality of light emission cells emitting light to display an image on the display surface; and
a light emission cell driving unit applying a voltage corresponding to display data including the position information on the contact surface derived by the position deriving unit to the light emission cells.

* * * * *